(12) United States Patent
Vachicouras et al.

(10) Patent No.: US 11,654,609 B2
(45) Date of Patent: May 23, 2023

(54) ENGINEERING REVERSIBLE ELASTICITY IN DUCTILE OR BRITTLE THIN FILMS AND PRODUCTS RESULTING FROM SAID ENGINEERING

(71) Applicant: ECOLE POLYTECHNIQUE FEDERALE DE LAUSANNE (EPFL), Lausanne (CH)

(72) Inventors: Nicolas Vachicouras, Chambesy (CH); Christina Myra Tringides, Ames, IA (US); Stephanie P. Lacour, Etoy (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 634 days.

(21) Appl. No.: 16/465,554

(22) PCT Filed: Nov. 29, 2017

(86) PCT No.: PCT/EP2017/080876
§ 371 (c)(1),
(2) Date: May 30, 2019

(87) PCT Pub. No.: WO2018/100005
PCT Pub. Date: Jun. 7, 2018

(65) Prior Publication Data
US 2020/0094466 A1 Mar. 26, 2020

Related U.S. Application Data

(60) Provisional application No. 62/429,048, filed on Dec. 1, 2016.

(51) Int. Cl.
*B32B 3/26* (2006.01)
*B32B 15/08* (2006.01)
(Continued)

(52) U.S. Cl.
CPC .......... *B29C 59/007* (2013.01); *B29C 55/023* (2013.01); *B29C 55/10* (2013.01);
(Continued)

(58) Field of Classification Search
CPC ........... B32B 3/266; B32B 15/08; B32B 3/30; B32B 9/005; B32B 2307/202
See application file for complete search history.

(56) References Cited

U.S. PATENT DOCUMENTS

2010/0330338 A1   12/2010   Boyce et al.
2012/0189796 A1   7/2012    Aoyagi et al.
(Continued)

OTHER PUBLICATIONS

Lacour, Stephanie P. et al., "Mechanisms of reversible stretchability of thin metal films on elastomeric substrates," Applied Physics Letters, 88:204103, 2006, 3 pages.
(Continued)

*Primary Examiner* — Joanna Pleszczynska
(74) *Attorney, Agent, or Firm* — Seed Intellectual Property Law Group LLP

(57) ABSTRACT

The present disclosure relates to how to engineer reversible elasticity in thin films and/or layers and/or substrates, using a repeated Y-shaped motif, which is cut out through the film and/or layer and/or substrate. As an example, using a 75 μm thick polyimide (PI) foil, macroscopic dog-bone shaped structures with a range of geometrical parameters of the Y shape have been prepared according to an embodiment of the present disclosure. The tensile strain response of the film at its point of fracture was then recorded. The structures were also confirmed using finite element modeling. Upon stretching, the PI ligaments locally deflect out of plane, allowing the foil to macroscopically stretch.

20 Claims, 44 Drawing Sheets

(51) Int. Cl.
*B29C 59/00* (2006.01)
*H01B 13/00* (2006.01)
*B29C 55/02* (2006.01)
*B29C 55/10* (2006.01)
*B29D 28/00* (2006.01)
*B29K 79/00* (2006.01)

(52) U.S. Cl.
CPC .............. *B29D 28/00* (2013.01); *B32B 3/266* (2013.01); *B32B 15/08* (2013.01); *H01B 13/0036* (2013.01); *B29K 2079/08* (2013.01); *B32B 2307/202* (2013.01)

(56) References Cited

U.S. PATENT DOCUMENTS

2016/0299270 A1 10/2016 Kotov et al.
2016/0306461 A1* 10/2016 Sugitani .................. G06F 3/047

OTHER PUBLICATIONS

Shyu, Terry C. et al., "A kirigami approach to engineering elasticity in nanocomposites through patterned defects," Nature Materials, 14:4327, Aug. 2015, 16 pages.
Vachicouras, Nicolas et al., "Engineering reversible elasticity in ductile and brittle thin films supported by a plastic foil," Extreme Mechanics Letters, vol. 15, 2017, pp. 63-69.

* cited by examiner

Figure 8  Graded distribution

Simulation Validation Convergence Analysis

| Perturbation magnitude | $1 \times 10^{-7}$ | $5 \times 10^{-7}$ | $9 \times 10^{-7}$ |
|---|---|---|---|
| Average von Mises stress [MPa] | 96.9 | 96.9 | 97.6 |
| Error [%] | 0 | 0 | 0.83 |

- Constant damping factor ($10^{-7}$)

| Damping Factor | $5 \times 10^{-8}$ | $1 \times 10^{-7}$ | $5 \times 10^{-7}$ |
|---|---|---|---|
| Average von Mises stress [MPa] | 94.4 | 96.9 | 90.4 |
| Error [%] | 0 | 2.65 | 4.24 |

- Constant perturbation magnitude ($5 \times 10^{-7}$)
- In green, the parameters chosen for the simulation

Experimental Methods – Stretching
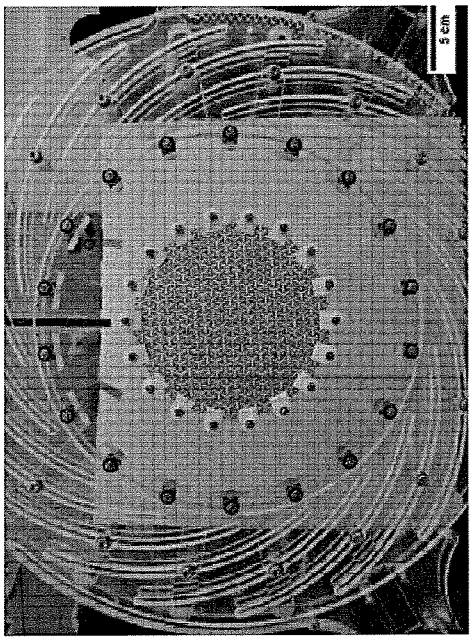
Radial stretcher
Radial stretch until break
(Schausberger et al. 2015)
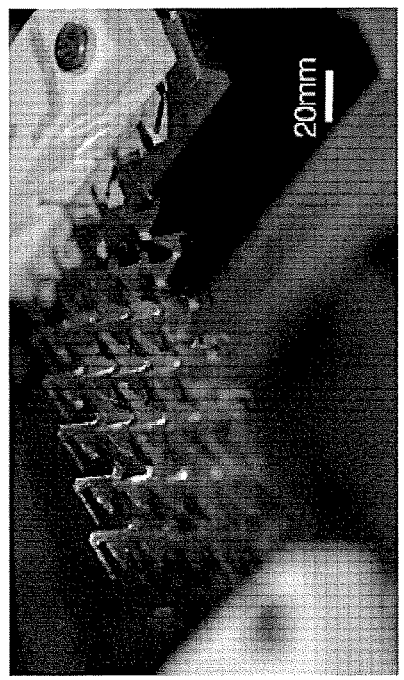
Homemade cycling machine
100k cycles
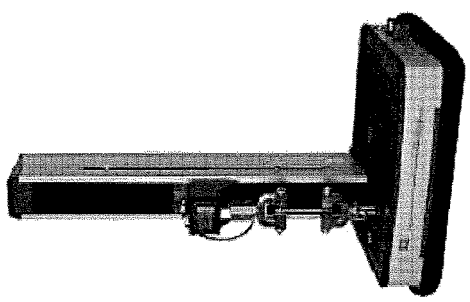
MTS Criterion Series 42
Elongation until break
Figure 15

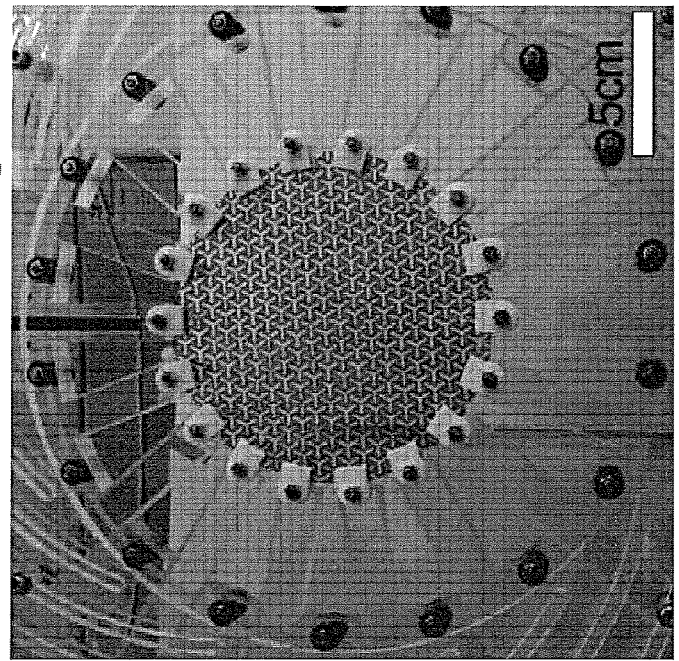
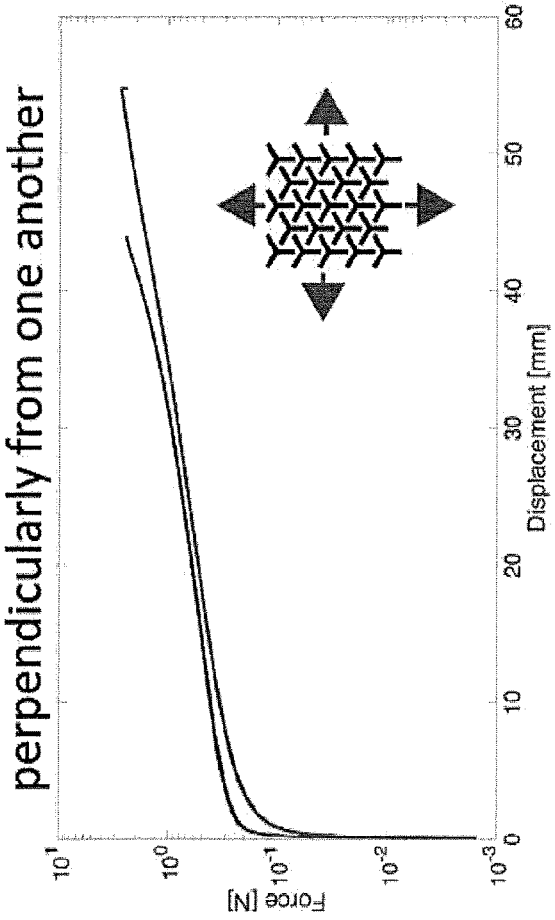
Figure 19

Effect of Thickness of PI Film

Effect of thickness vs. Spring constant

Thicknesses tested:
- Experiment: 25, 50, 75 μm
- Simulation: 5, 10, 25, 50, 75, 125 μm

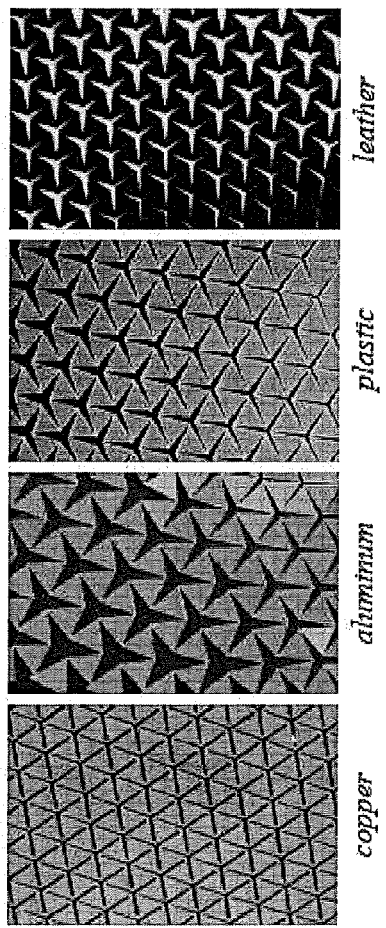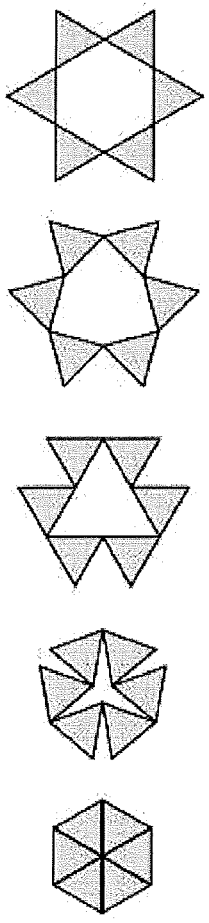
Figure 35
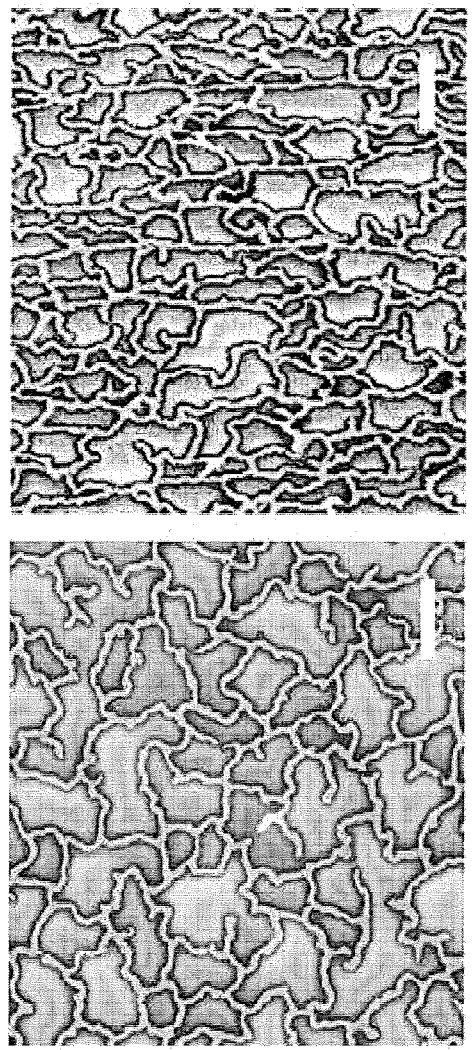
Figure 36

ENGINEERING REVERSIBLE ELASTICITY IN DUCTILE OR BRITTLE THIN FILMS AND PRODUCTS RESULTING FROM SAID ENGINEERING

BACKGROUND

Technical Field

The present invention relates to how to engineer reversible elasticity in thin films, and/or layers and/or substrates.

Description of the Related Art

Recent developments in stretchable electronics have enabled a large range of new technologies, such as neural implants that can conform to the curvature of the rat spinal cord for electrical stimulation.

These applications require the development of electrical conductive materials that can maintain their electrical properties under mechanical stress However, electronic materials exhibit limited elasticity. Brittle films display fracture strains of less than about 5%. Ductile films undergo plastic flow at strains larger than 5%. Methods to avoid these problems can be classified in two broad categories: (1) using intrinsically stretchable materials or (2) using conventional rigid materials in unconventional designs.

Intrinsically stretchable materials include percolating composites where nano-structures (such as graphene or single-walled carbon nanotubes) are mixed in a rubber matrix to form a stretchable conductive composite. The nano-structures can slide upon stretching and maintain a percolating pathway. Another recent reported method is a bi-phasic (liquid-solid) film of gold and gallium, which can stretch up to 400%. Finally, gold evaporated on PDMS can spontaneously form a microcracked structure (1-10 μm) that allows the metal to stretch by out-of-plane deformation of the microcracks, while allowing the microcracks to maintain a percolating pathway for electrical conductivity. All these strategies have the advantage of not requiring any design adjustments, as the materials are intrinsically stretchable. However, these strategies are restricted to a very few specific materials that may not be suitable for certain applications, for example, due to lack of biocompatiblity.

Another set of approaches consists in designing conventional conductors into meander-like structures that can deflect out-of-plane to release strain and diminish the local strain experienced by the conductor. Typical methods include using fractal designs, serpentines and other more complex designs based on unit cells, such as a horse-shoe. The advantage of these approaches is that they can be used with more conventional materials. However, they generate restrictions on the design of the structure. For example, it is impossible to make a straight line with a serpentine approach. This implies the necessity of taking into account these geometries into the design. Moreover, the engineered strain in such structures is usually limited to only a certain direction.

More recently "kirigami" approaches have been proposed to pattern thin films with arrays of cuts that direct buckling and folding processes in such a way that reduces local stresses in the materials. This technique was proposed to engineer elasticity in nano-composites by patterning notches, which allow increases in the ultimate elongation of the material. This approach is interesting, but the slit geometry does not allow for isotropic stretching of the structure.

As an example, according to the prior art, a cutting pattern composed of equilateral triangles arranged in a regular lattice has been proposed. Each triangle is connected to three adjacent triangles at hinge vertices. When stretching the surface, triangles can rotate around the hinges relative to their neighbors, forming hexahedral openings. In the completely open configuration, i.e., when stretching the material maximally, the triangles and openings form a trihexagonal pattern, also known as the Kagome lattice, as illustrated in FIG. 35.

According to a further prior art example as shown in FIG. 36, a gold nanomesh (Au nanomesh) structure has been proposed, which has been optimized in terms of topology and/or tuning adhesion of metal nanomeshes on a soft substrate so to improve stretchability and eliminate strain fatigue.

The Au nanomesh in this example fabricated by using a method called grain boundary lithography that includes depositing an indium film and etching to form a mask layer, followed by bilayer metallization. The as-made Au nanomeshes consist of well-interconnected, serpentine Au ligaments with a line width of ~70 nm, a thickness of ~40 nm, and a mesh size of ~1 μm. The Au nanomesh is then transferred to a pre-stretched PDMS substrate followed by releasing.

According to a further prior art example, a flexible and stretchable patterned substrate having a strain-permitting material (such as e.g. unfilled or filled vulcanized rubbers, natural or synthetic rubbers, crosslinked polymers, crosslinked elastomers, block copolymers, segmented copolymers, thermoplastic polymers, or thermoplastic vulcanizates, and epoxies) has been proposed, said substrate comprising a patterned conformation creating a plurality of geometrically-structured and shaped strain relief features contiguously bridging larger domains that allows the flexible patterned substrate to experience local strain or local strain domains lower than the macroscopic strain of the flexible and stretchable patterned substrate. To do so, the material is patterned with a structured (regular or irregular) system of "strain relief features" (SRFs) such as pores, slots, through holes, areas of reduced thickness, or a secondary material of contrasting mechanical behavior. The SRFs facilitate continuous and/or piecewise continuous low strain domains (LSDs) throughout the entire substrate—where low strain domains are defined as regions that experience strain levels (magnitude) lower than the macroscopic (average, homogenized) levels (magnitude) of strain applied to the integrated device.

According to still a further prior art example, electronic circuits, devices and device components including one or more stretchable components, such as stretchable electrical interconnects, electrodes and/or semiconductor components have been proposed. Stretchability of some of these systems is achieved via a materials level integration of stretchable metallic or semiconducting structures with soft, elastomeric materials in a configuration allowing for elastic deformations to occur in a repeatable and well-defined way.

In particular, the example provides for an electronic circuit comprising an elastic substrate and a stretchable metallic or semiconducting device component supported by said elastic substrate; said stretchable metallic or semiconducting device component comprising a plurality of electrically conductive elements each having a primary unit cell shape, said electrically conductive elements connected in a sequence having a secondary shape providing an overall two-dimensional spatial geometry characterized by a plurality of spatial frequencies; wherein said two-dimensional spatial geometry of said metallic or semiconducting device component allows for accommodation of elastic strain along one or more in-plane or out of plane dimensions, thereby providing stretchability of said electronic circuit.

The drawbacks affecting the methods and/or solutions for engineering elasticity in intrinsically not elastic materials (films, substrates, layers or the like) relate to the facts that said methods are expensive and/or difficult to be carried out, said methods are not reliable, and the elasticity as induced and/or obtained is not satisfactory as desired, rendering the films and/or substrates and/or layers (with supposed elasticity) actually not suitable for the most important applications.

BRIEF SUMMARY

The main goal of the present invention is that of overcoming the drawbacks affecting the methods and/or solutions according to the prior art.

A further goal of the present invention is that of providing a method and/or solution allowing to engineer (induce and/or confer) effective, reliable and permanent elasticity in intrinsically not elastic material.

According to an embodiment, a repeated Y-shaped motif is used, which is cut out throughout the film. In particular, the present invention relates to the preparation of macroscopic dog-bone shaped structures with a range of geometrical parameters of the Y shape using a 75 μm thick polyimide (PI) foil. The tensile strain response of the film at its point of fracture has been recorded.

Within the frame of the present invention, the expression "intrinsically not elastic material" has to be understood as meaning a material which, once subjected to strain (pressure, stress, stretching, distortion or the like) either breaks or is deformed permanently, i.e. without gaining again in a spontaneous and/or natural way, its original shape and dimensions.

To the contrary, and still within the frame of the present invention, "engineering elasticity in intrinsically not elastic material" has to be understood as meaning treating such a intrinsically not elastic material of the kind mentioned above, in such a way that said material, after treatment according to the present invention, does behave like an elastic material, meaning that, once subjected to strain (pressure, stress, stretching, distortion or the like) does not break or is deformed permanently, but gains again in a spontaneous and/or natural way, its original shape and dimensions as soon as the strain is removed.

The present invention arises from the general consideration that the drawbacks affecting the prior art methods can be overcome and the desired goals can be achieved by providing an adapted "kirigami" approach to engineer elasticity in intrinsically not elastic materials. This novel approach is inspired by the topography of stretchable gold films on silicone, which display dense distributions of Y-shaped cracks to favor out of-plane deformation As an example, according to the present invention, Y-shaped motifs throughout plastic films have been patterned and cut. These structured films allow for elasticity without any preferential direction. Still according to the present invention, this patterns can be transferred to an additional electrically conductive layer that can stretch higher than its ultimate strain. The present invention can moreover be applied to ductile metals such as platinum (Pt), as well as with to brittle conductive materials, such as indium tin oxide (ITO) or the like.

In view of the above considerations, and the drawbacks affecting the prior art and the goals to be achieved, according to an embodiment of the present invention there is provided a method for engineering elasticity in a layer of intrinsically non-elastic material, said method comprising:

Providing a layer of intrinsically non-elastic material;

forming a plurality of throughout cuts in said layer, each extending through the thickness of said layer;

wherein the projection of each of said throughout cuts on at least one of the opposite main surfaces of said layer is shaped so as to comprise a plurality of at least three branches extending from a common portion.

According to an embodiment, said cuts are formed so that, on said at least one main surface of said layer, at least two of the branches of at least one of said cuts have the same length (a).

According to an embodiment, said cuts are formed so that, on said at least one main surface of said layer, the branches of at least one of said cuts have the same length (a).

According to an embodiment, said cuts are formed so that, on said at least one main surface of said layer, the length of each of the branches of at least one of said cuts is comprised in a predefined range.

According to an embodiment, said cuts are formed so that, on said at least one main surface of said layer, at least two of the branches of at least one of said cuts have the same width (w).

According to an embodiment, said cuts are formed so that, on said at least one main surface of said layer, the branches of at least one of said cuts have the same width (w).

According to an embodiment, said cuts are formed so that, on said at least one main surface of said layer, the width of each of the branches of at least one of said cuts is comprised in a predefined range.

According to an embodiment, said layer extend along a length direction (X) and a width direction (Y) substantially perpendicular to said length direction (X), wherein said cuts are formed so that, on said at least one main surface of said layer, for at least two of said cuts, two respective branches extend along a direction which is parallel to one of said directions (X) and (Y).

According to an embodiment, on at least said one main surface of said layer, N cuts/cm$^2$ are formed on average, with N ranging from 1 to 100 million.

According to an embodiment, said layer is a plastic layer, formed from a plastic material.

According to an embodiment, said layer is a brittle and/or ductile layer, formed using one or both of a brittle material and a ductile material.

According to an embodiment, said layer is formed from one or both of PI and PET or similar material as recited in the claims.

According to an embodiment, said layer has a thickness comprised in a predefined range.

According to the present invention there is further provided a method for engineering elasticity in a multilayer substrate, said method comprising:

Providing a multilayer substrate comprising at least a bottom layer of electrically isolating (non-conductive), intrinsically non-elastic material and, on said bottom layer, a top layer of electrically conductive, intrinsically non-elastic material;

forming a plurality of throughout cuts in said substrate, each extending through the thickness of each of said bottom and top layers;

wherein the projection of each of said throughout cuts on at least one of the opposite main surfaces of said multilayer substrate is shaped so as to comprise a plurality of at least three branches extending from a common portion.

According to an embodiment, said cuts are formed so that, on said at least one main surface of said multilayer substrate, at least two of the branches of at least one of said cuts have the same length (a).

According to an embodiment, said cuts are formed so that, on said at least one main surface of said multilayer substrate, the branches of at least one of said cuts have the same length (a).

According to an embodiment, said cuts are formed so that, on said at least one main surface of said multilayer substrate, the length of each of the branches of at least one of said cuts is comprised in a predefined range.

According to an embodiment, said cuts are formed so that, on said at least one main surface of said multilayer substrate, at least two of the branches of at least one of said cuts have the same width (w).

According to an embodiment, said cuts are formed so that, on said at least one main surface of said multilayer substrate, the branches of at least one of said cuts have the same width (w).

According to an embodiment, said cuts are formed so that, on said at least one main surface of said multilayer substrate, the width of each of the branches of at least one of said cuts is comprised in a predefined range.

According to an embodiment, said multilayer substrate extend along a length direction (X) and a width direction (Y) substantially perpendicular to said length direction (X), and wherein said cuts are formed so that, on said at least one main surface of said multilayer substrate, for at least two of said cuts, two respective branches extend along a direction which is parallel to one of said directions (X) and (Y).

According to an embodiment, on at least said one main surface of said multilayer substrate, N cuts/cm$^2$ are formed on average, with N ranging from 1 to 100 million.

According to an embodiment, said bottom layer is a plastic layer, formed from a plastic material.

According to an embodiment, said bottom layer is a brittle and/or ductile layer, formed using one or both of a brittle material and a ductile material.

According to an embodiment, said bottom layer is formed from one or both of PI and PET and/or similar material.

According to an embodiment, said bottom layer has a thickness comprised in a predefined range.

According to an embodiment, said top layer is formed from a conductive metal.

According to an embodiment, said top layer is formed from a conductive metal oxide.

According to an embodiment, said top layer has a thickness comprised in a predefined range.

According to the present invention there is further provided a method for forming a stretchable electrode, said method comprising:

Providing a multilayer substrate comprising at least a bottom layer of electrically isolating (non-conductive), intrinsically elastic material and, on said bottom layer, a top layer of electrically conductive, intrinsically non-elastic material;

Said method further comprising engineering elasticity in at least said top layer by forming a plurality of throughout cuts in said top layer, each extending through the thickness of said top layer;

wherein the projection of each of said throughout cuts on at least the exposed main surface of said multilayer substrate is shaped so as to comprise a plurality of at least three branches extending from a common portion.

According to an embodiment, said cuts are formed so that, on said at least one exposed main surface of said top layer, at least two of the branches of at least one of said cuts have the same length (a).

According to an embodiment, said cuts are formed so that, on said at least one exposed main surface of said top layer, the branches of at least one of said cuts have the same length (a).

According to an embodiment, said cuts are formed so that, on said at least one exposed main surface of said top layer, the length of each of the branches of at least one of said cuts is comprised in a predefined range.

According to an embodiment, said cuts are formed so that, on said at least one exposed main surface of said top layer, at least two of the branches of at least one of said cuts have the same width (w).

According to an embodiment, said cuts are formed so that, on said at least one exposed main surface of said top layer, the branches of at least one of said cuts have the same width (w).

According to an embodiment, said cuts are formed so that, on said at least one exposed main surface of said top layer, the width of each of the three branches of at least one of said cuts is comprised between a predefined range.

According to an embodiment, said top layer extend along a length direction (X) and a width direction (Y) substantially perpendicular to said length direction (X), wherein said cuts are formed so that, on said at least one exposed main surface of said top layer, for at least two of said cuts, two respective branches extend along a direction which is parallel to one of said directions (X) and (Y).

According to an embodiment, on at least said one exposed main surface of said multilayer substrate, N cuts/cm$^2$ are formed on average, with N ranging from 1 to 100 million.

According to an embodiment, said bottom layer is a rubber layer, formed from a rubber material.

According to an embodiment, said bottom layer has a thickness comprised in a predefined range.

According to an embodiment, said top layer is formed from a conductive metal.

According to an embodiment, said top layer is formed from a conductive metal oxide.

According to an embodiment, said top layer has a thickness comprised in a predefined range.

According to the present invention there are further provided a layer, a multilayer substrate and an electrode according to the appended claims.

BRIEF DESCRIPTION OF THE SEVERAL VIEWS OF THE DRAWINGS

In the following, description will be given of examples and/or embodiments of the present invention, in particular of the examples and/or embodiments which are depicted in the drawings, However, the present invention is not limited to the examples and/or embodiments as disclosed in the following and/or as depicted in the drawings, but comprises all variants of same which fall within the scope of the appended claims.

In the drawings:

FIGS. 11 to 32 show parameters, data results of simulation methods or the like;

FIG. 35 shows a prior art cutting pattern composed of equilateral triangles arranged in a regular lattice;

FIG. 36 shows a prior art gold nanomesh (Au nanomesh) structure;

DETAILED DESCRIPTION

Figure 6:
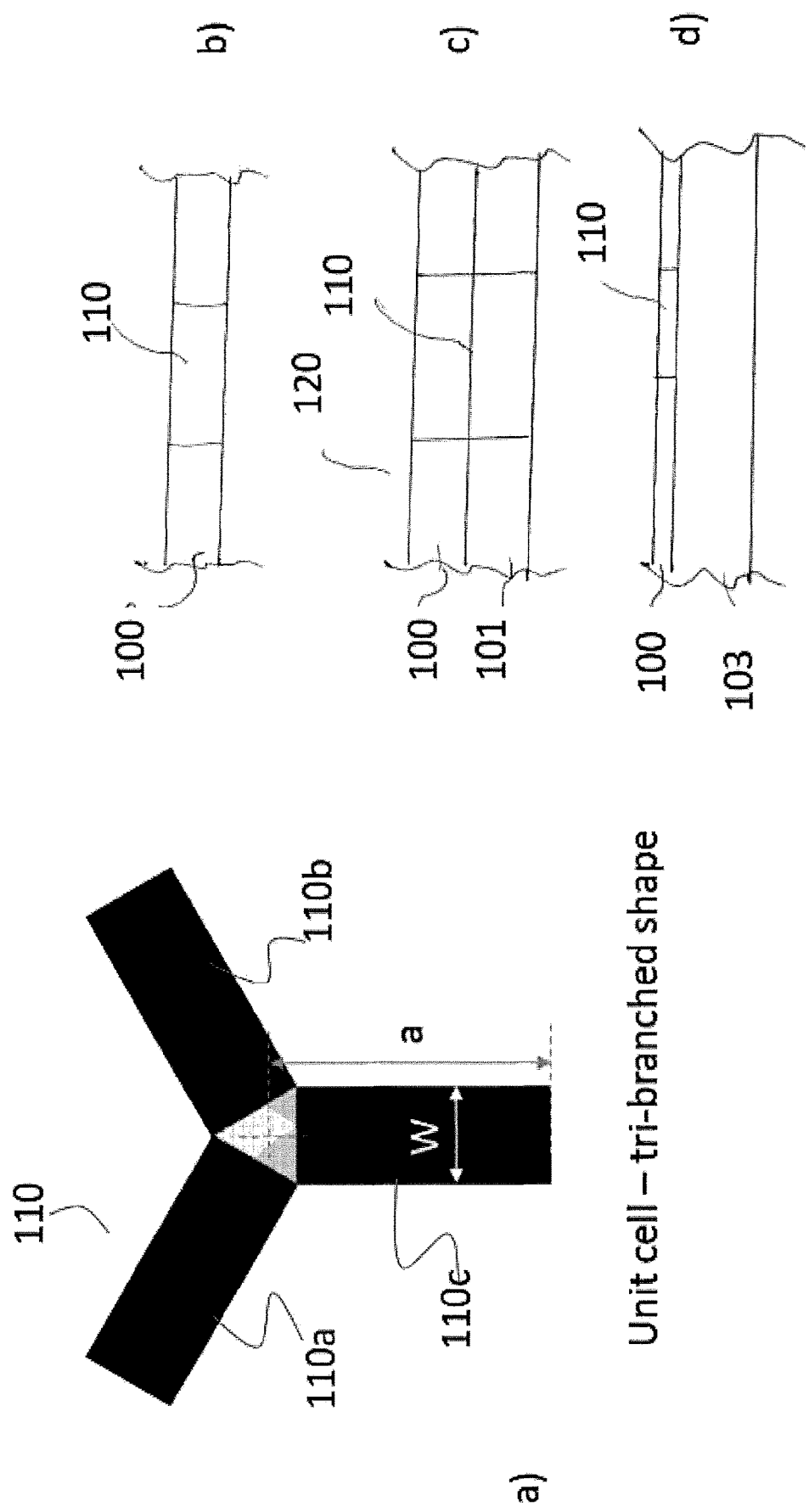
FIGS. 6 to 10 show both planar and cross sectional view of layers and/or substrates and/or films engineered according to the present invention.

FIG. 6a shows a plan view of a cut of the kind formed according to an embodiment of the present invention; the cut 110 is Y shaped and comprises three branches 110a, 110b and 110c.

As depicted in FIGS. 6b to 6c, the cut 110 may be formed in a single layer 100 of intrinsically not elastic material, either conductive or not conductive, as well as in each of the layers 100 and 101 (each of them being intrinsically not elastic and either conductive or not conductive) of a multilayer substrate 120, or even in an intrinsically not elastic layer 100 (either conductive or not conductive) provided on an elastic layer 103, for instance a rubber and/or PDMS layer or the like, either conductive or not conductive.

The cut may be formed according to one of wet and/or dry etching, mechanical punching or the like and extends throughout the thickness of the relevant layer and/or substrate.

For instance, the cut extends throughout the thickness of the layer 100 (between the two main exposed surfaces thereof), as well as throughout the thickness of the substrate 120 (between the two main exposed surfaces thereof), and between the thickness of the layer 100 in FIG. 6d, namely between the main exposed surface thereof and the opposite main surface contacting the bottom layer 103.

As depicted in each of FIGS. 7 to 10, a plurality of cuts 110 is formed in either a layer and/or substrate.

As anticipated above, within the meaning of the present invention, layers, films, substrates and even multilayer and/or stacked substrates can be engineered.

As an example, a plurality of stacked materials can be engineered, and the number of stacked materials can vary from one to tens or more, and the kind of materials can vary as well.

For example, a substrate comprising:
a membrane of polyimide
a tri-layer: polyimide/titanium (Ti)/polyimide
5 layers: polyimide/Ti/platinum (Pt)/Ti/polyimide
7 layers: SiO2 polyimide/Ti/Pt/Ti/polyimide/SiO2
can be engineered.

The stack may also include polymers such as adhesion promoters, or self-assembled monolayers.

The nature of the materials within the stack may be electrically insulating or conducting or semiconducting.

Still within the scope of the present invention, addition of an elastic encapsulation of the engineered elastic stack and/or layer and/or substrate can be envisaged As an example, the engineered stack and/or layer and/or film and/or substrate can be embedded within an intrinsically elastic material (e.g. silicone rubber).

Still within the scope of the present invention, a distinction can be made between the one or more carrier elastic materials and the top—encapsulating elastic material. They may be distinct materials (e.g. two types of silicone rubber).

The elastic encapsulation may be a plain membrane but may also contain openings through its thickness so that some pads on the engineered elastic stack become exposed, for instance for the purpose of electrically contacting the exposed layer (when conductive and/or semiconductive).

These openings will be primarily patterned in the top encapsulating elastic material but there could be a scenario where the carrier elastic material also comprises openings and/or vias.

Figure 7:
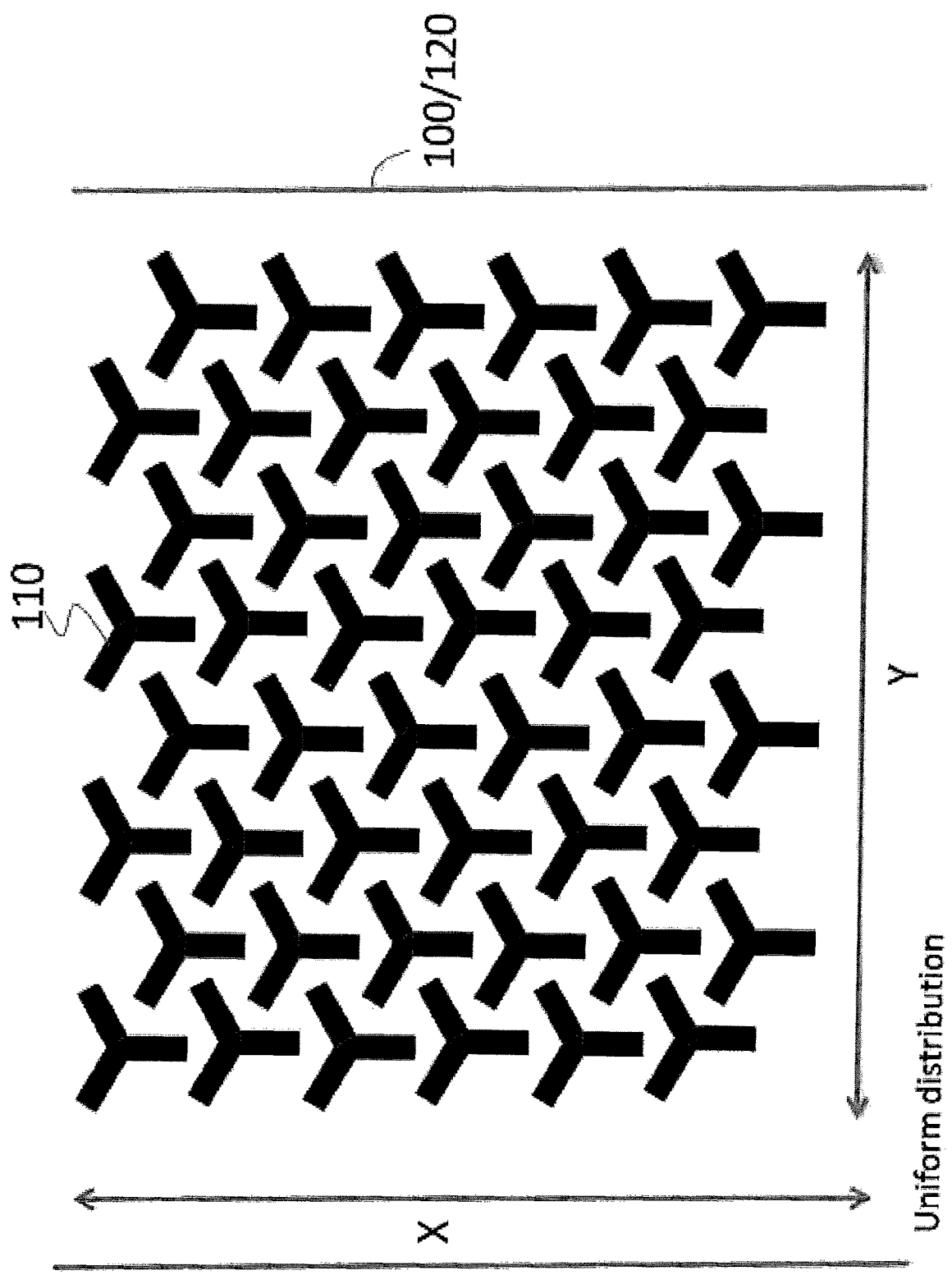
Figure 8:
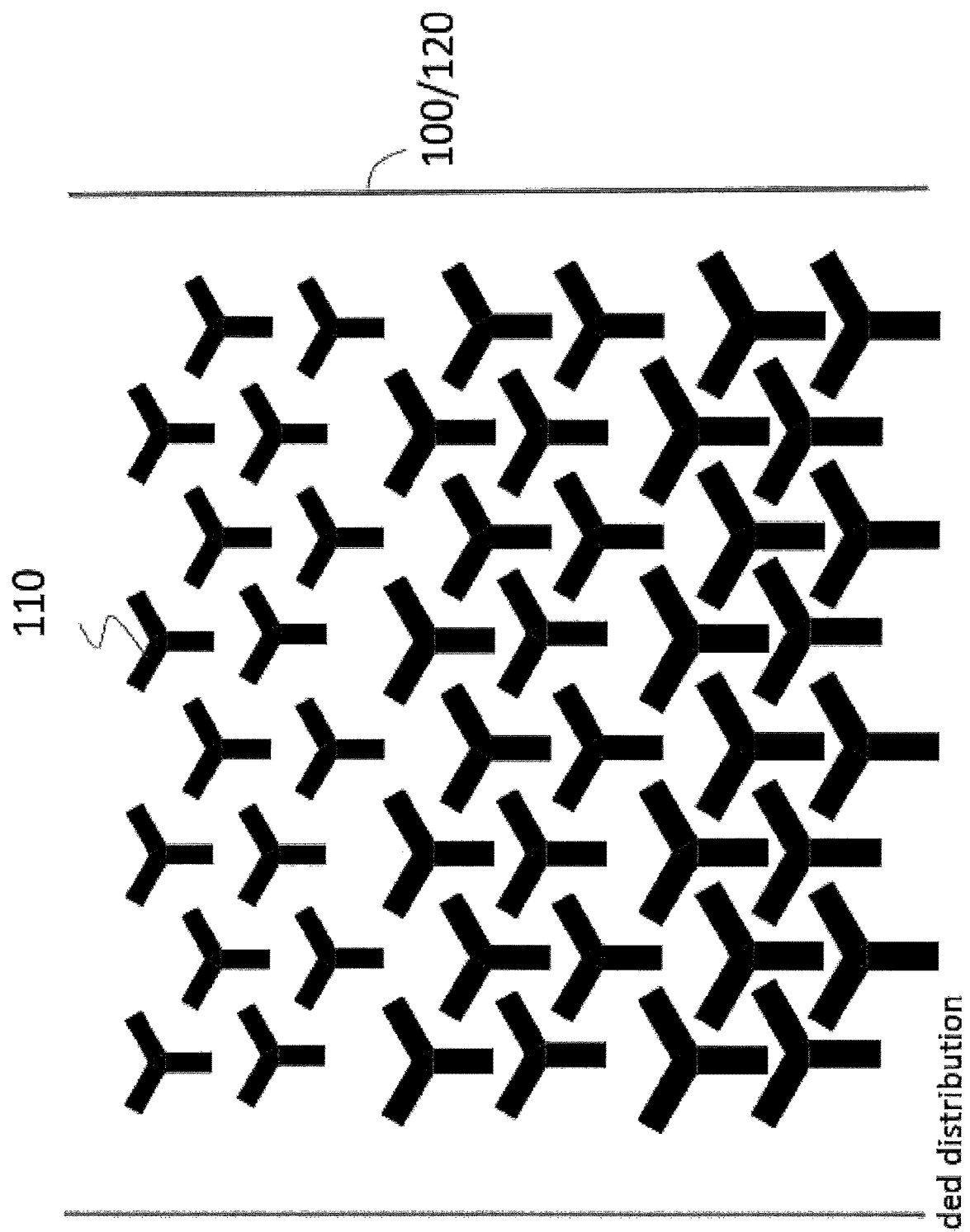
Figure 9:
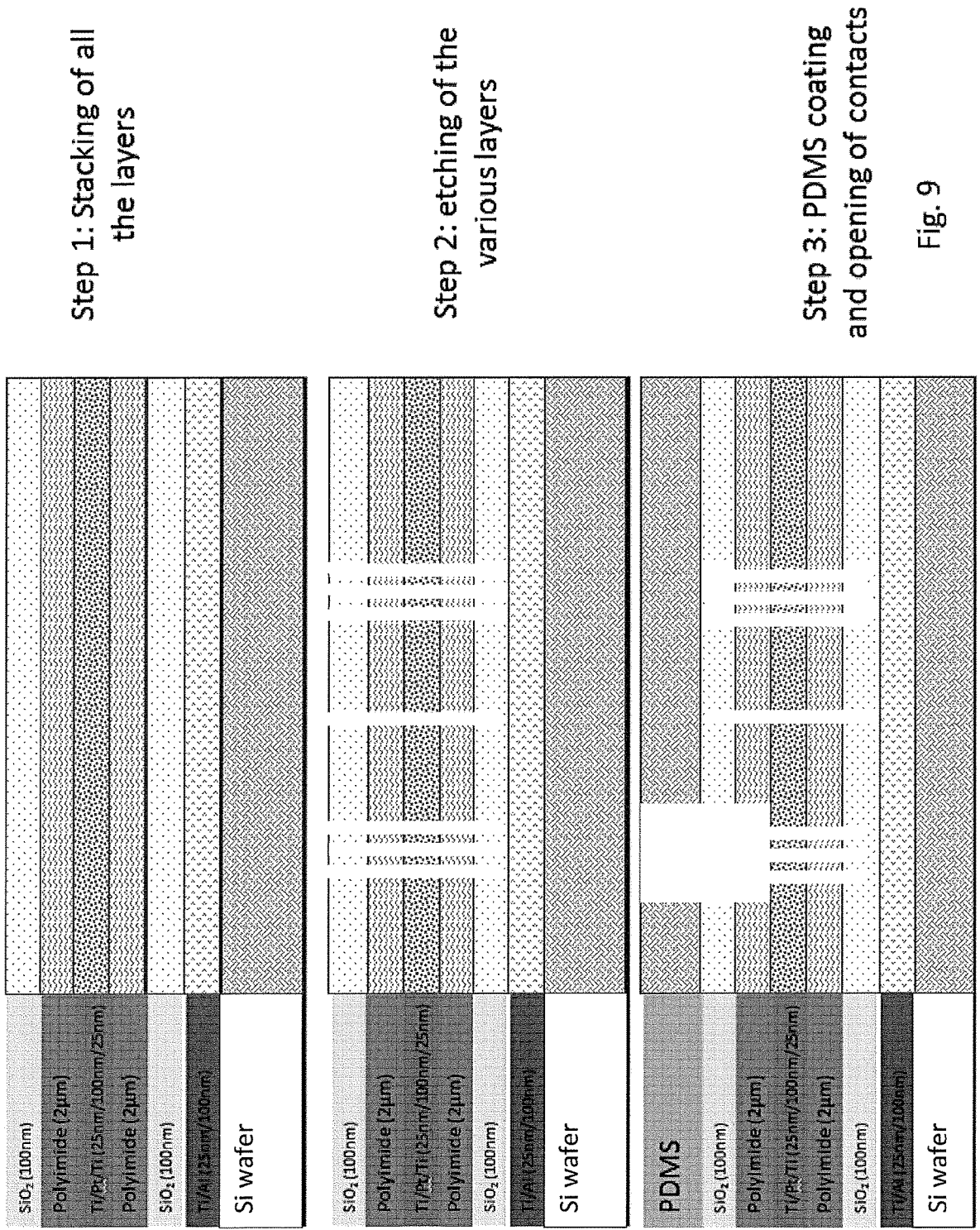
Figure 10:
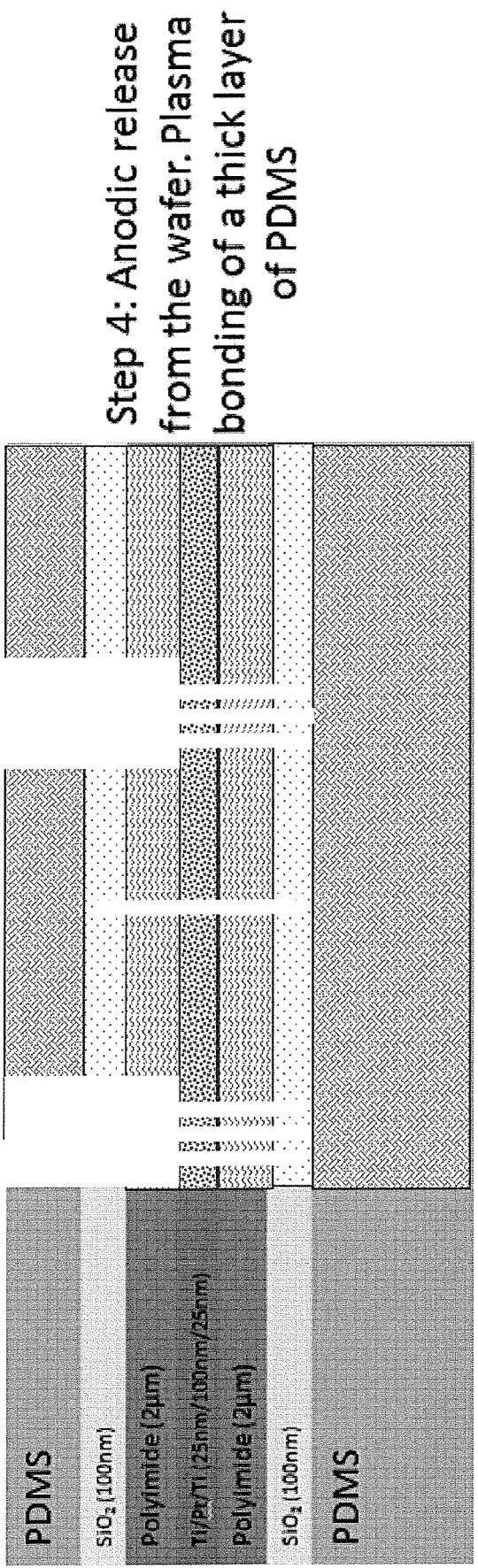
Figure 11:
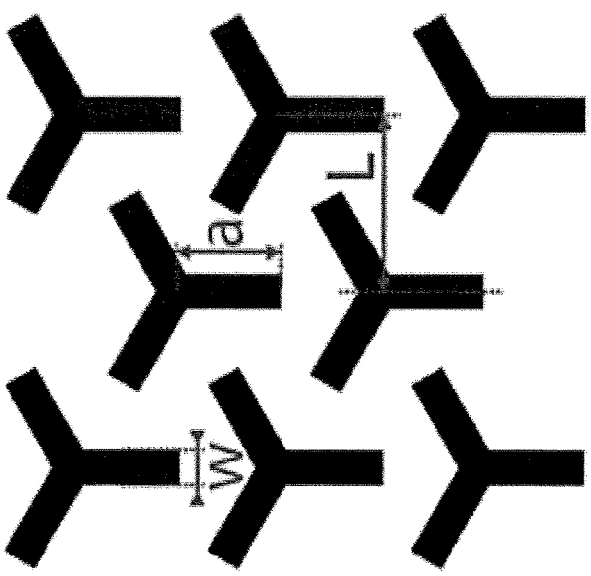
Figure 12:
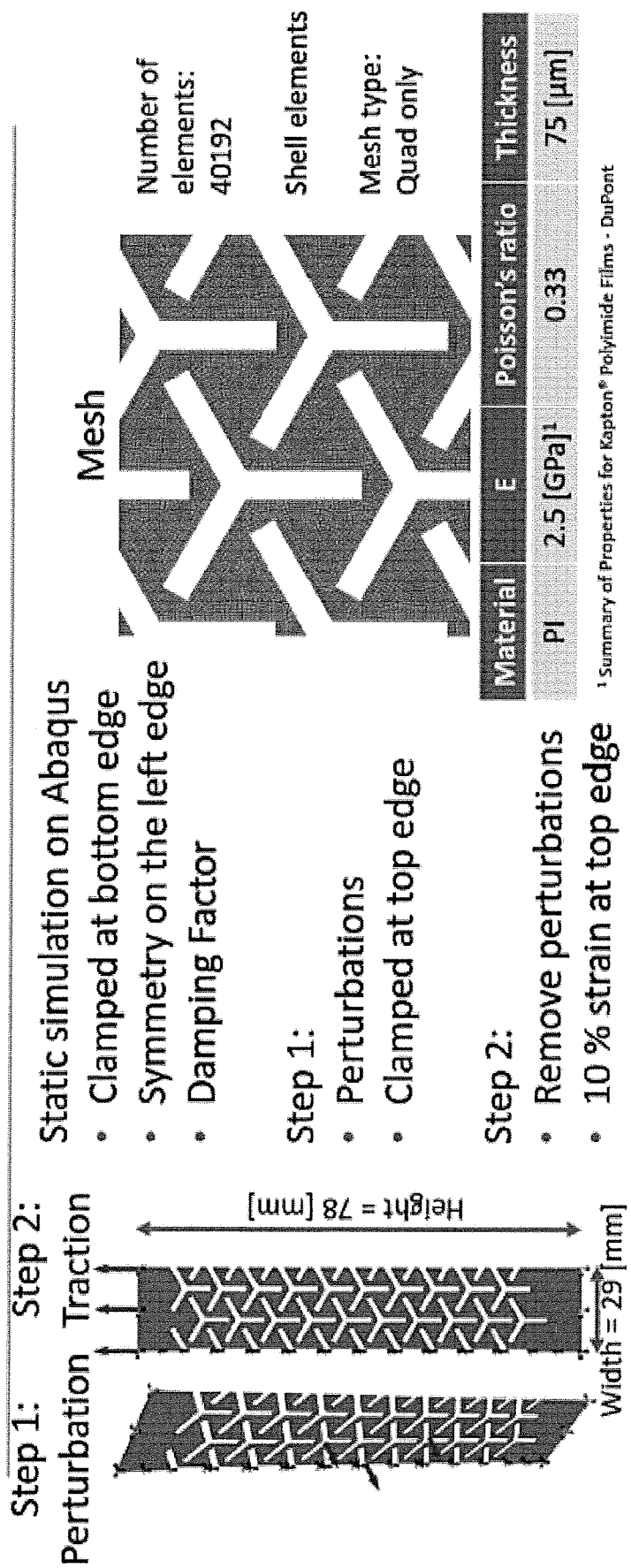
Figure 13:
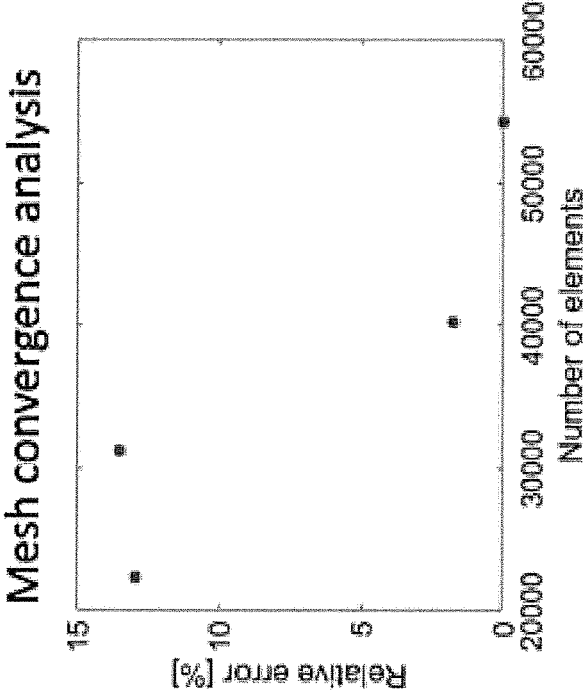
Figure 14:
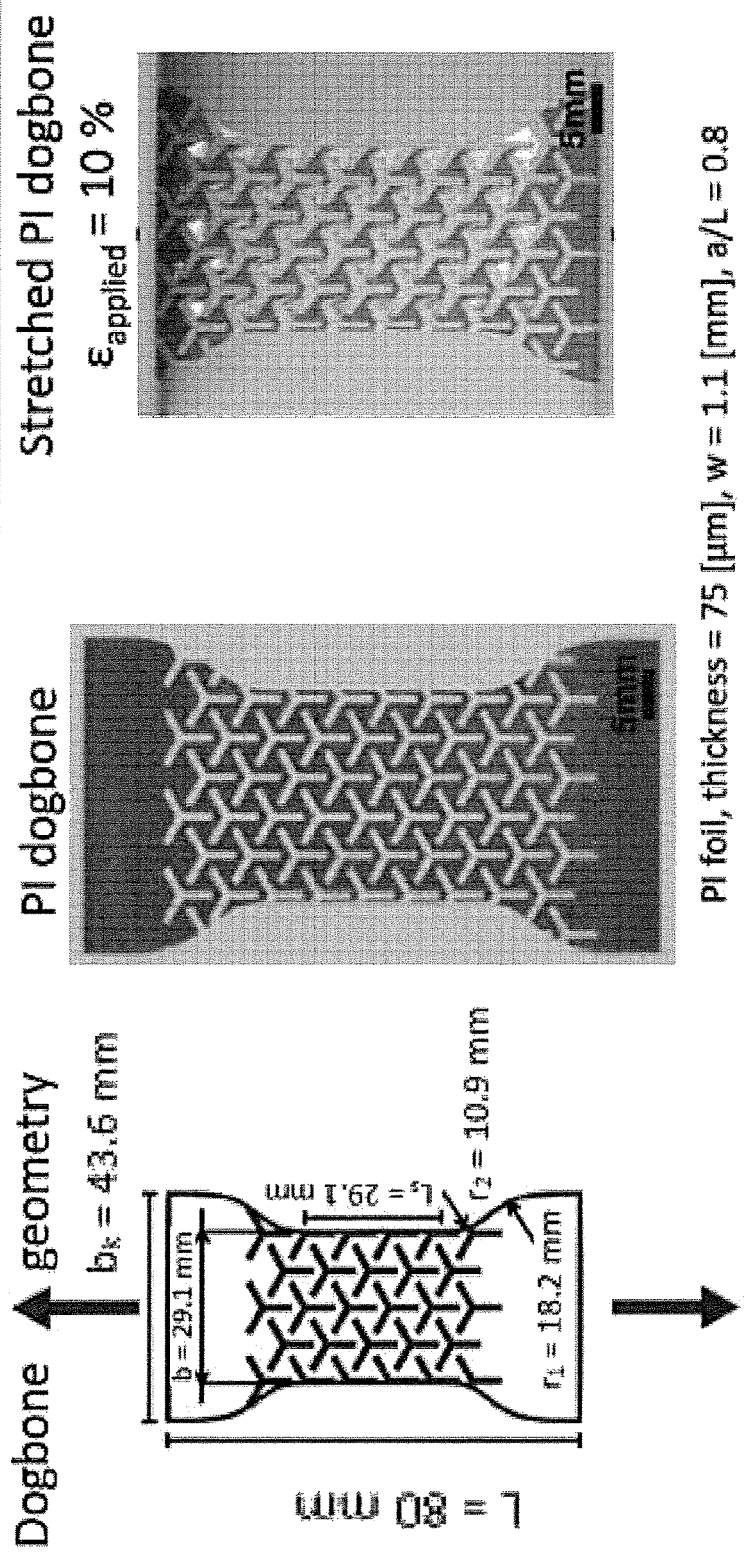
Figure 16:
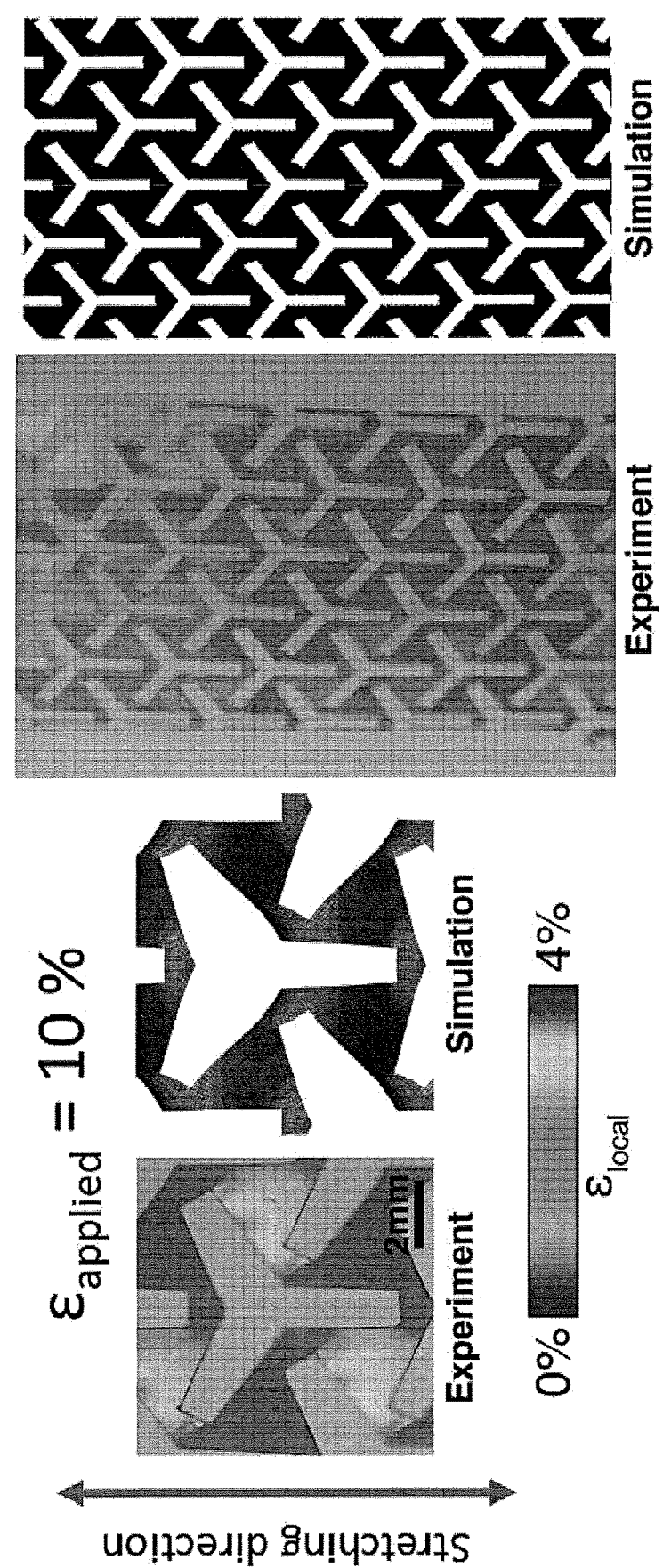
Figure 17A:
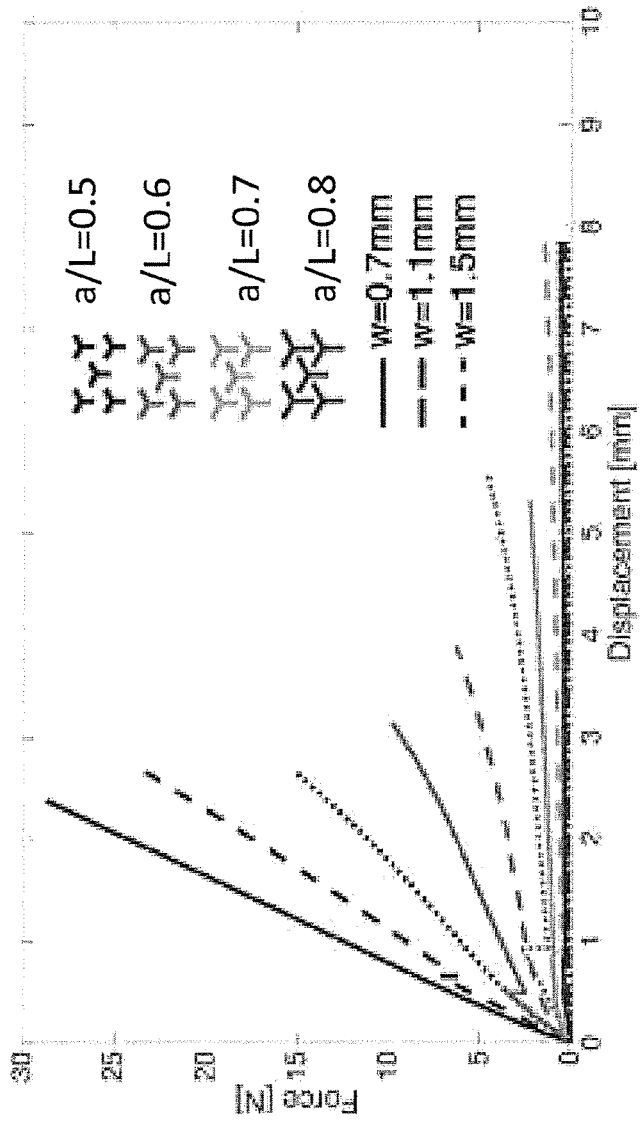
Figure 17B:
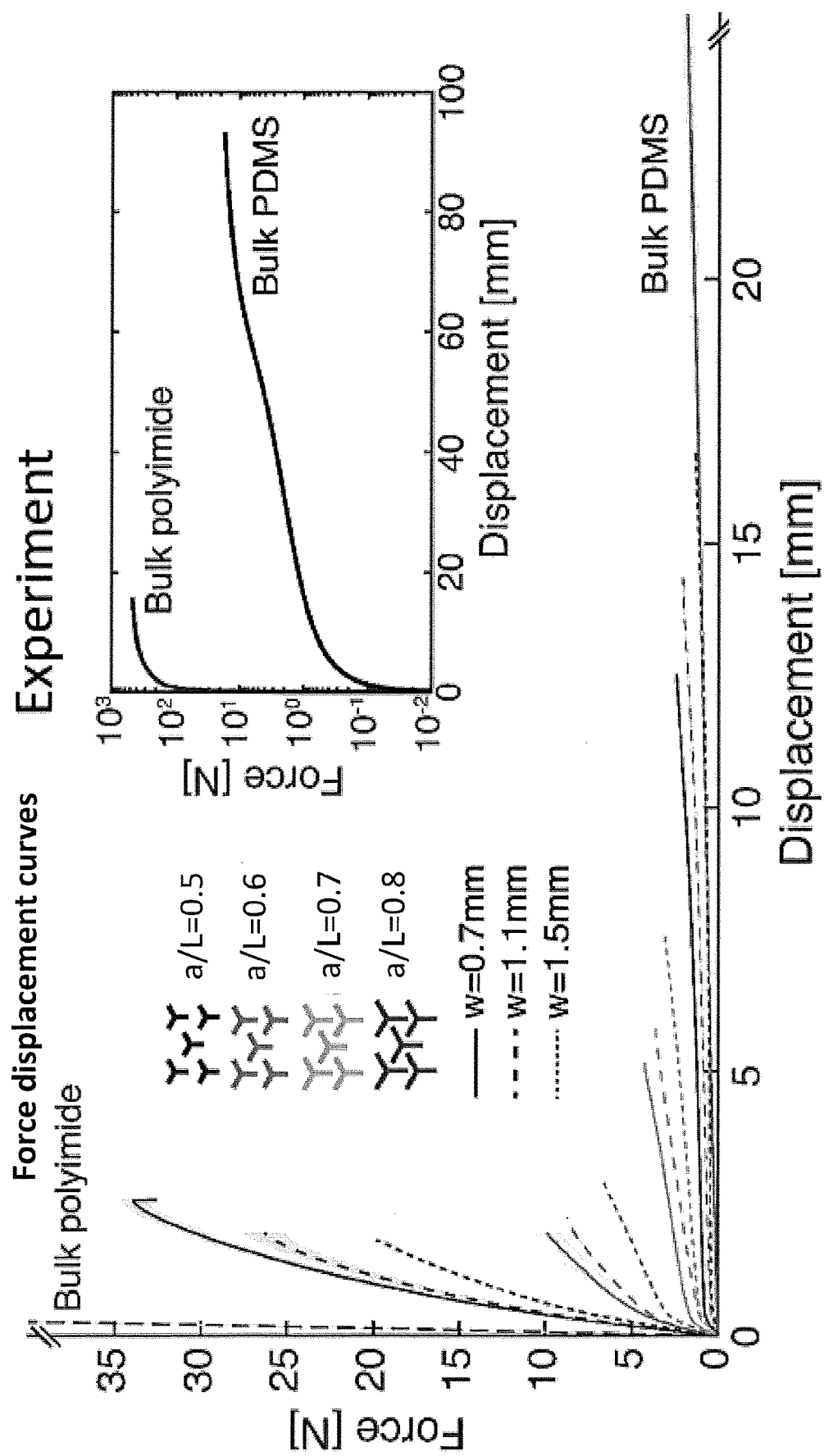
Figure 18:
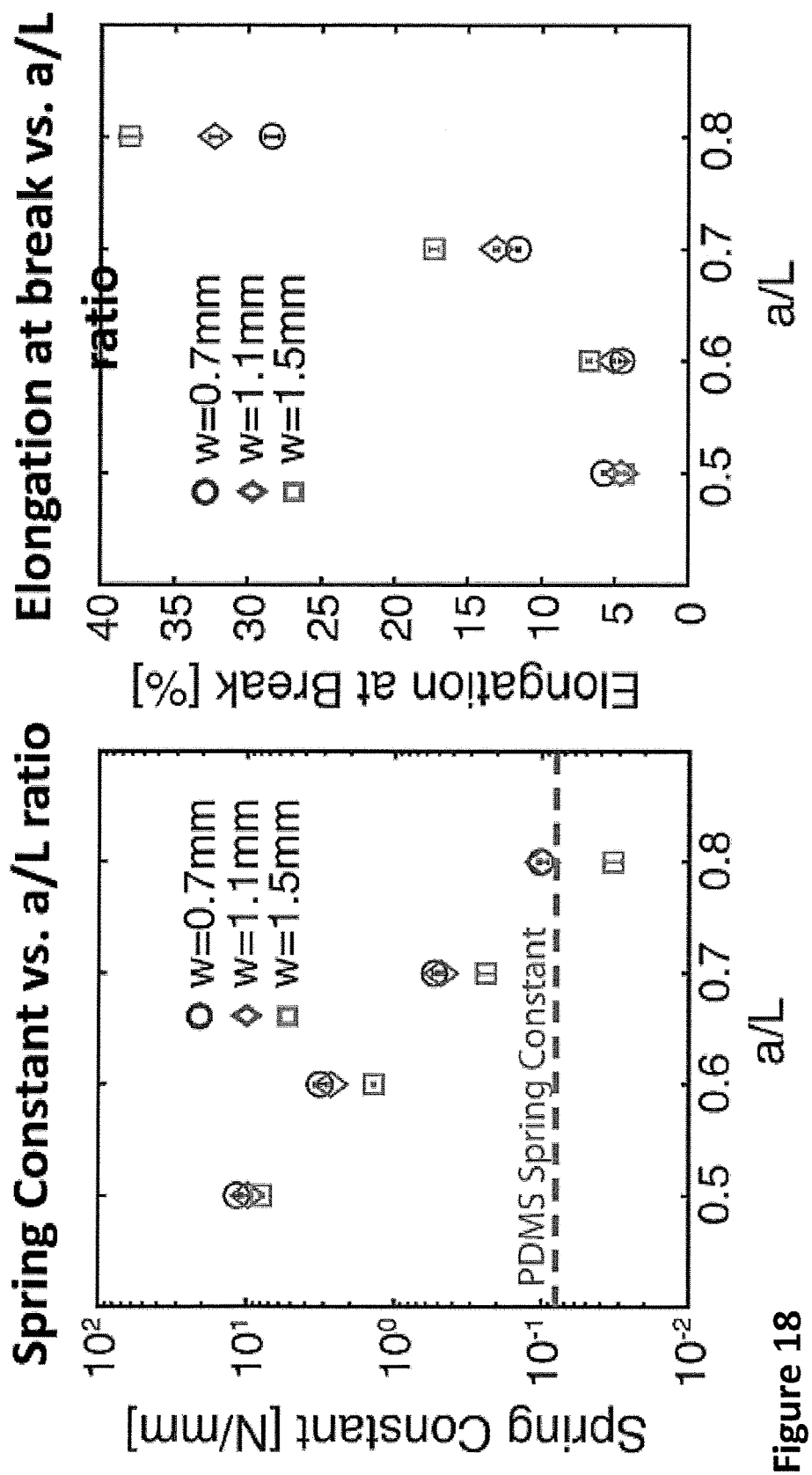
Figure 20:
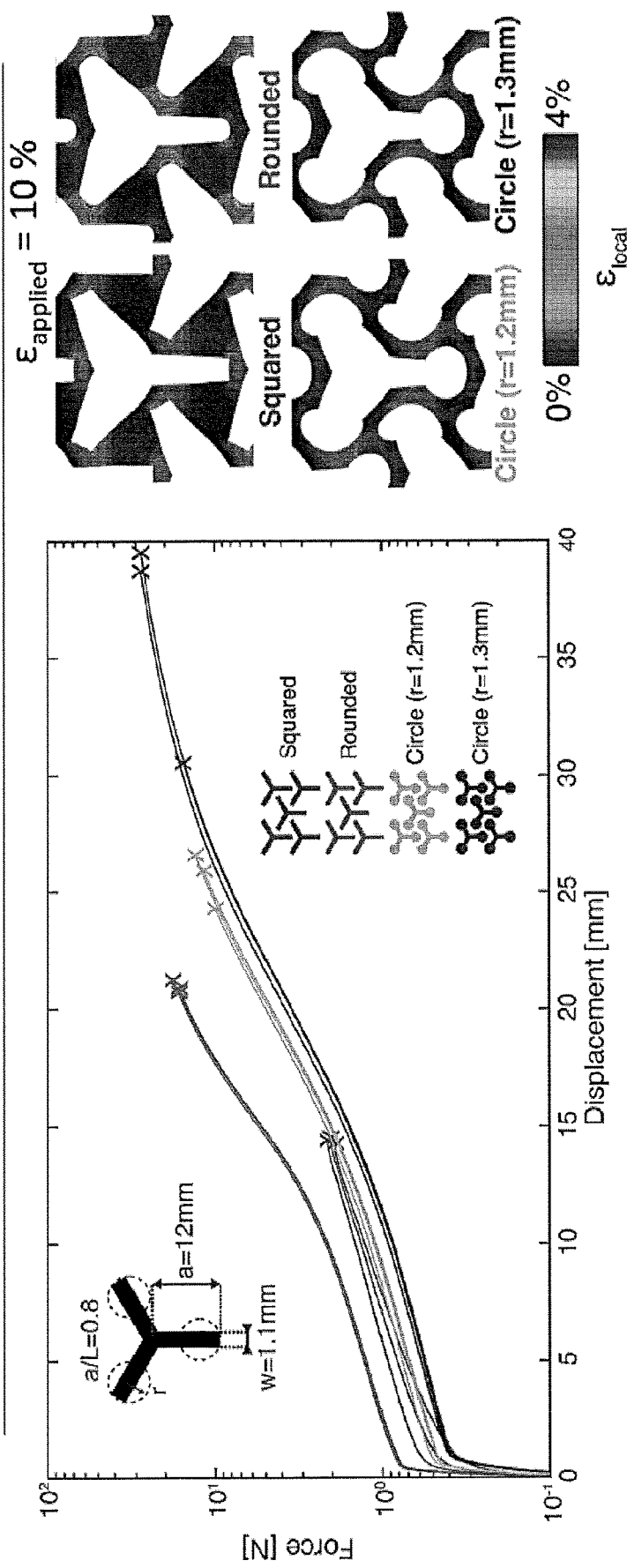

As depicted for instance in FIG. 7, a plurality of cuts 110 are formed in a layer and/or substrate or the like.

Within the scope of the present invention, the cuts can be dense or thin according to the needs and/or circumstances. Moreover, the dimension (size) and/or orientation of the cuts can be selected as well according to the needs and/or circumstances.

As to both the size of the cuts and their possible orientations examples will be disclosed in the following.

As to the density of the cuts, same may be defined as follows and possible ranges of same may be as follows.

Cuts/cm$^2$: the ratio can vary from 1 cut/cm$^2$ to 100 million cuts/cm$^2$.

Spacing: distance between the 2 centers (center lines of the Y, (see parameter L as disclosed below). L can vary from 1 um to 1 cm (or more); 10-25 um spacing may be preferred.

Transparency: ratio between the open surface area over total surface area. This can range from 25 to 90%. but does not capture the density of cuts.

By changing the density of cuts, it is possible to modulate the resulting elasticity of the engineered elastic layer and/or substrate and/or stack or the like. This is particularly relevant when the elastic stack hosts interconnects linking rigid electronic hardware.

Figure 21:
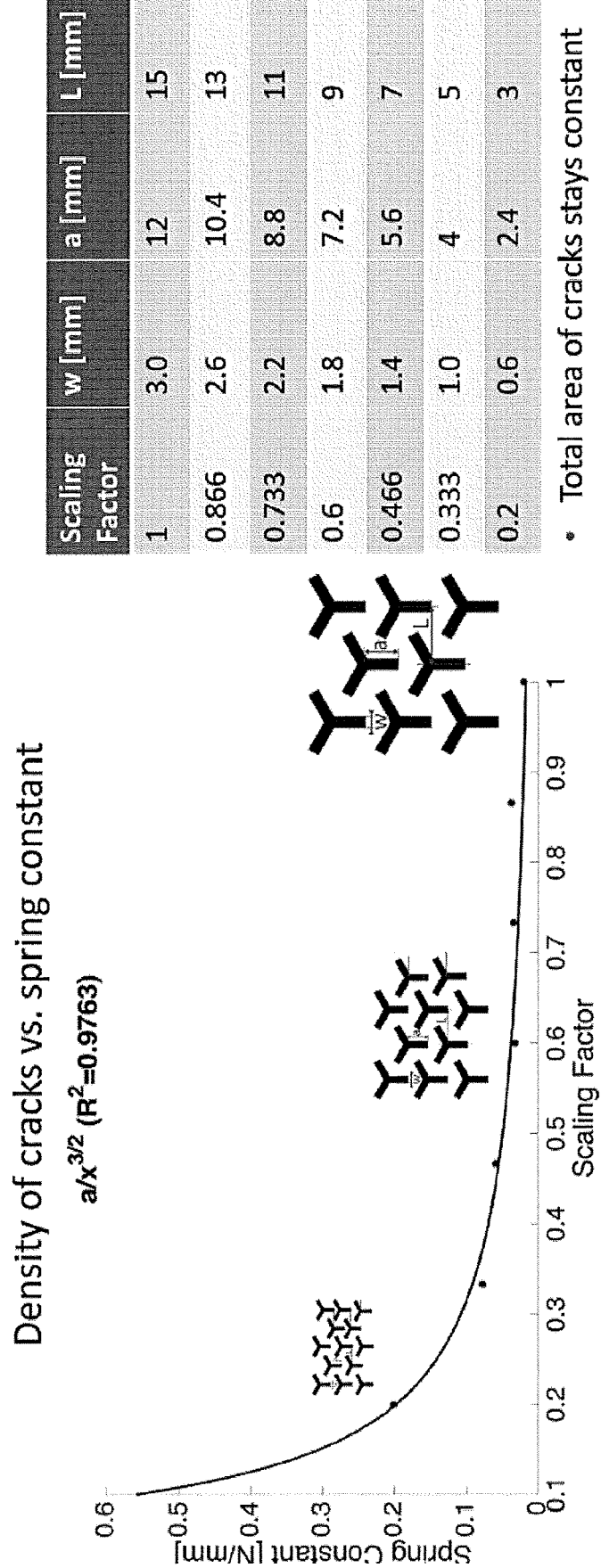
Figure 22:
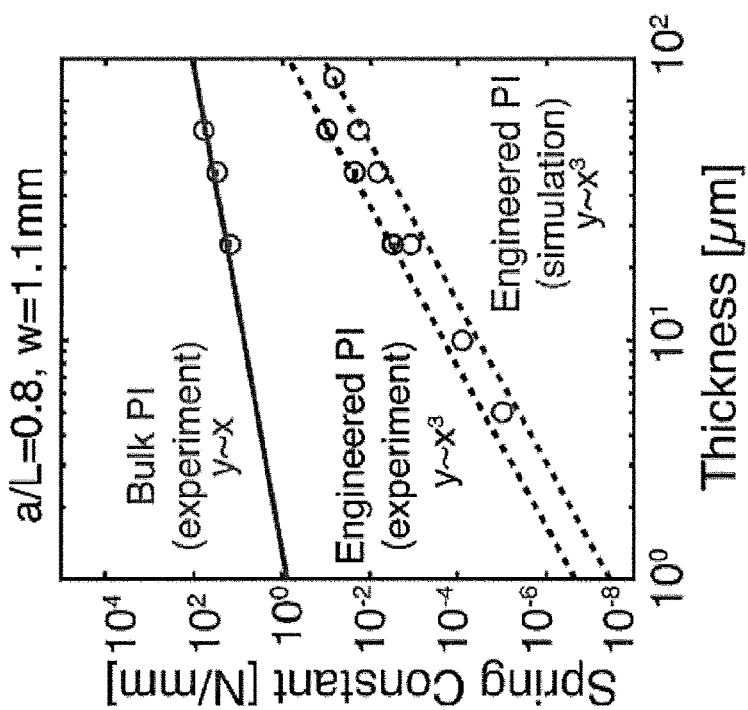
Figure 23:
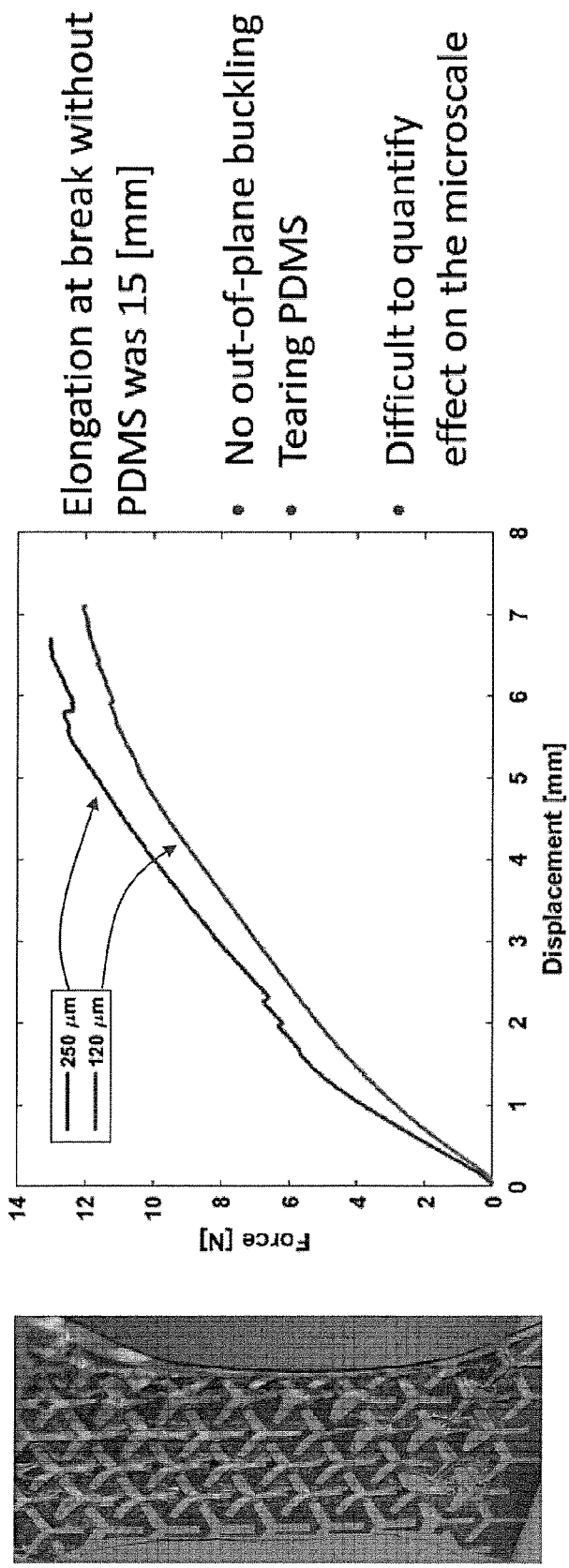
Figure 24:
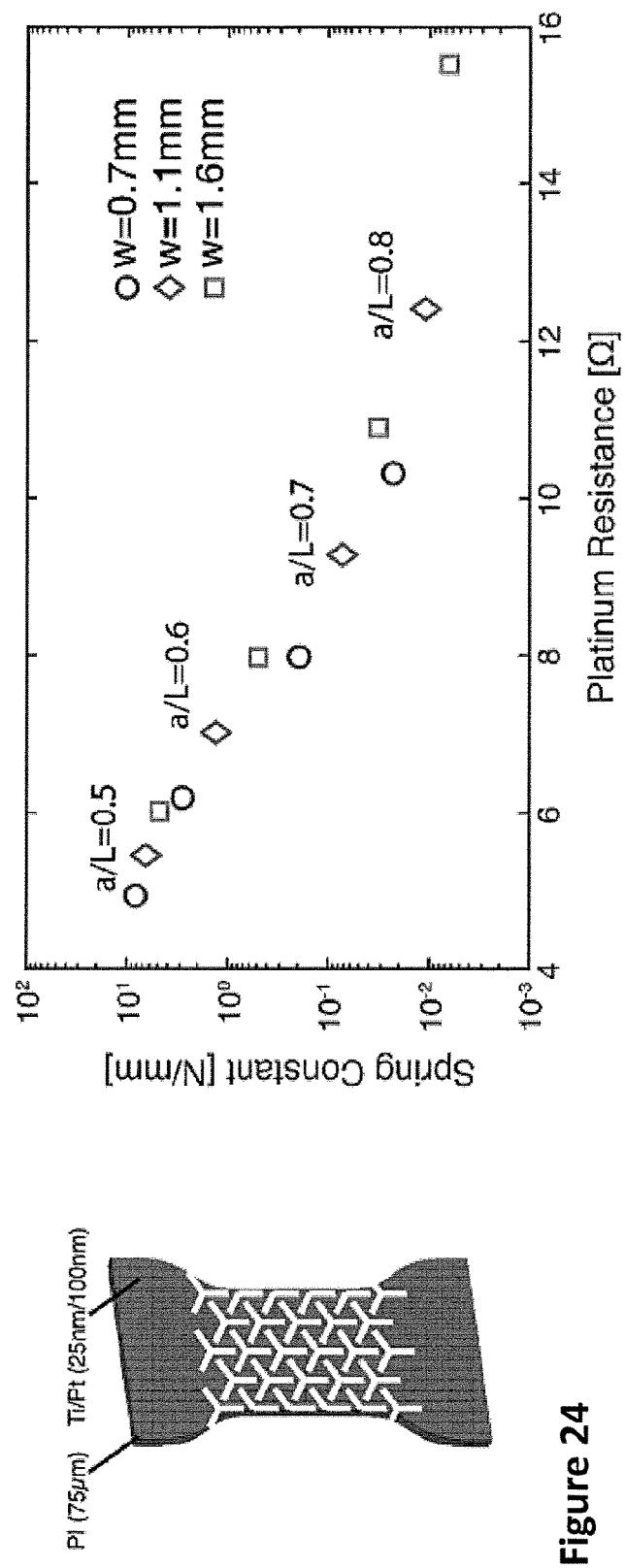
Figure 25A:
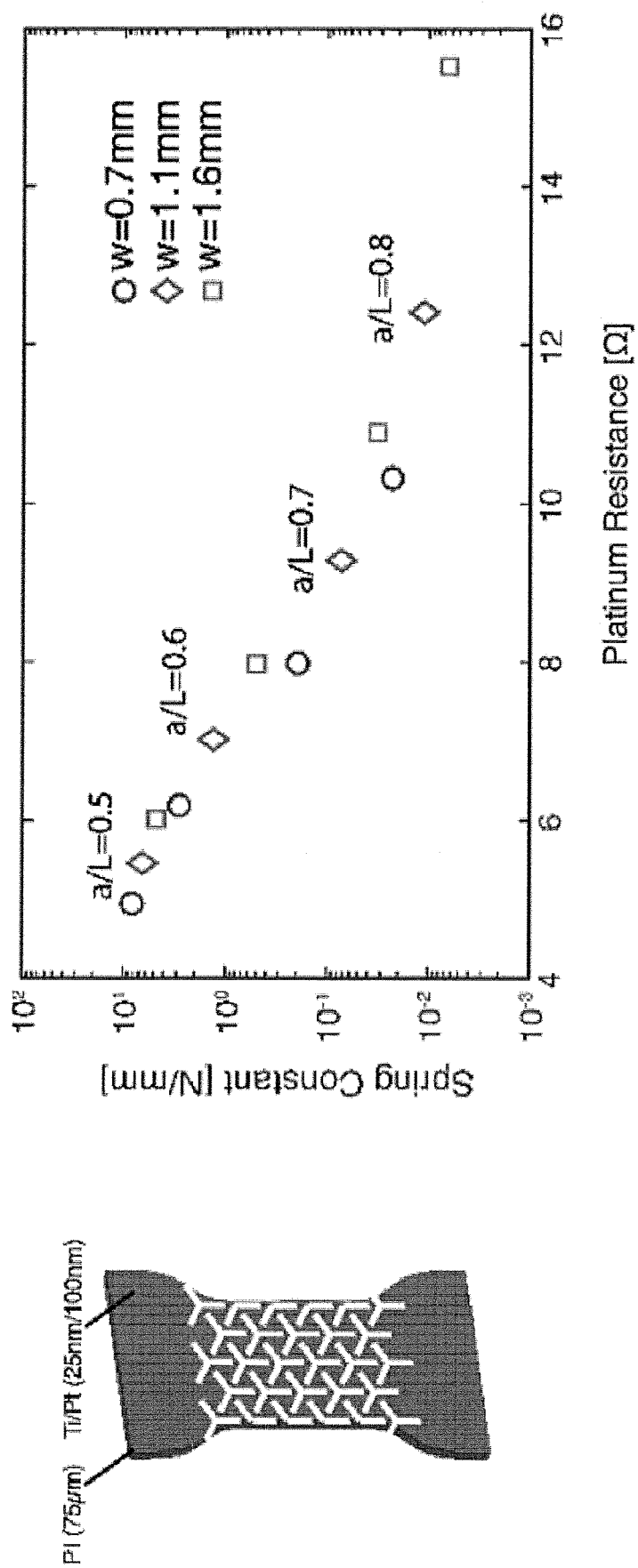
Figure 25B:
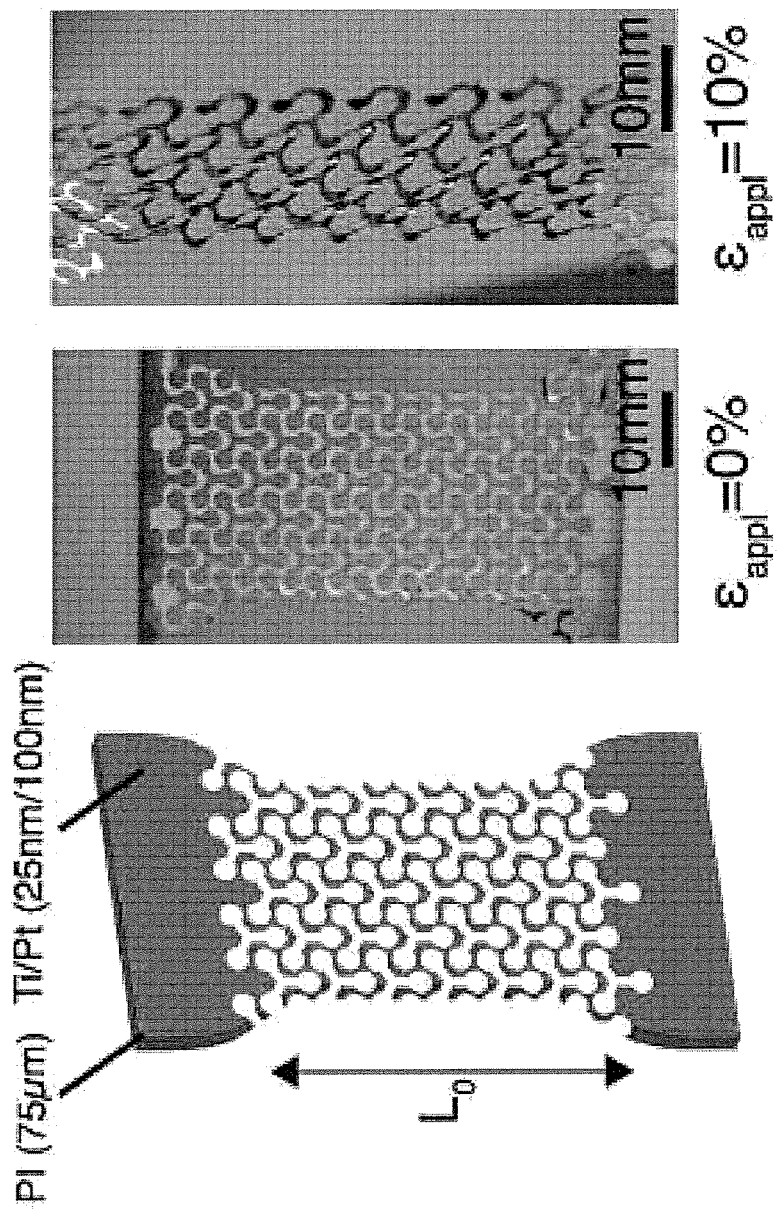
Figure 25C:
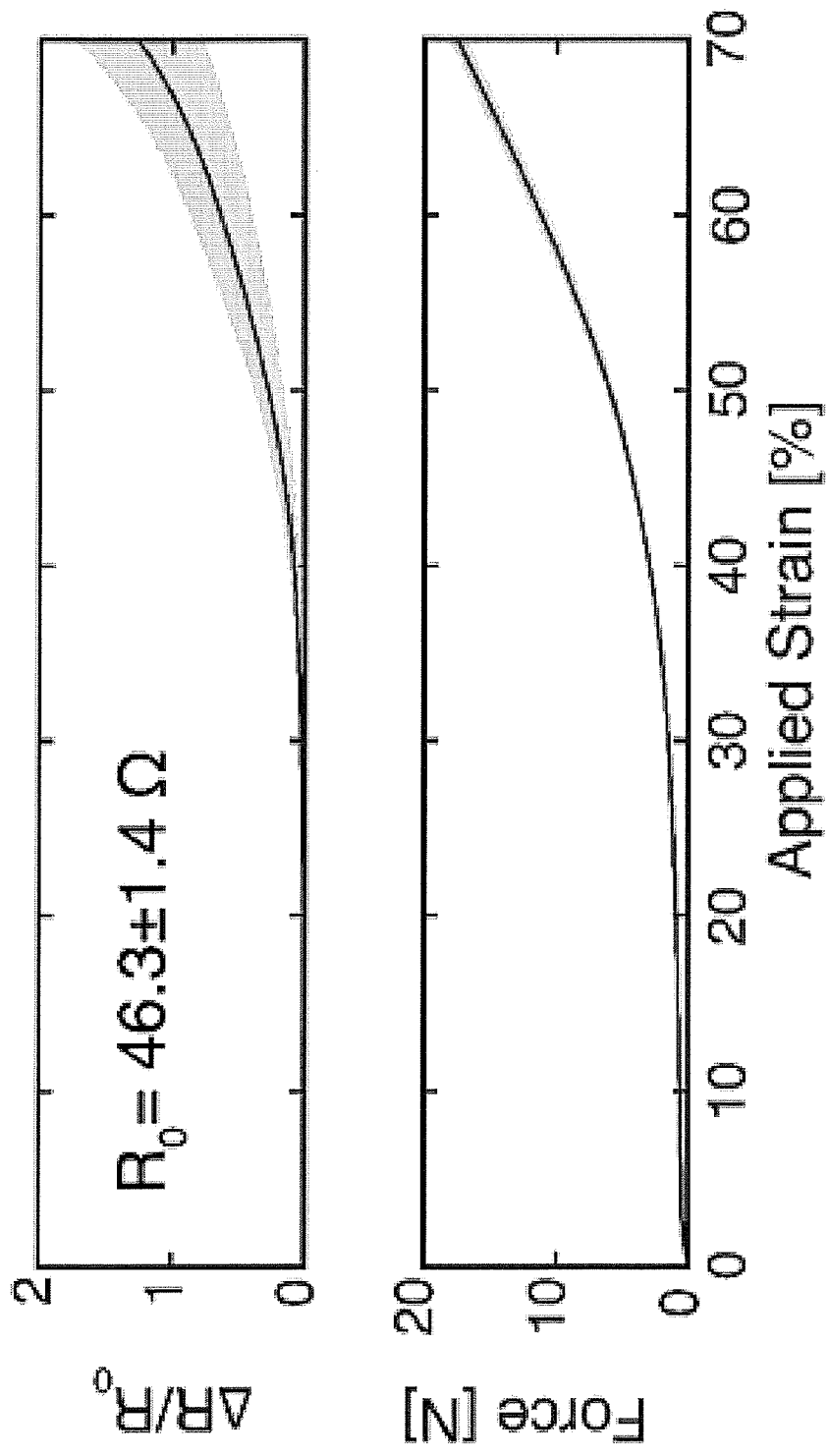
Figure 26A:
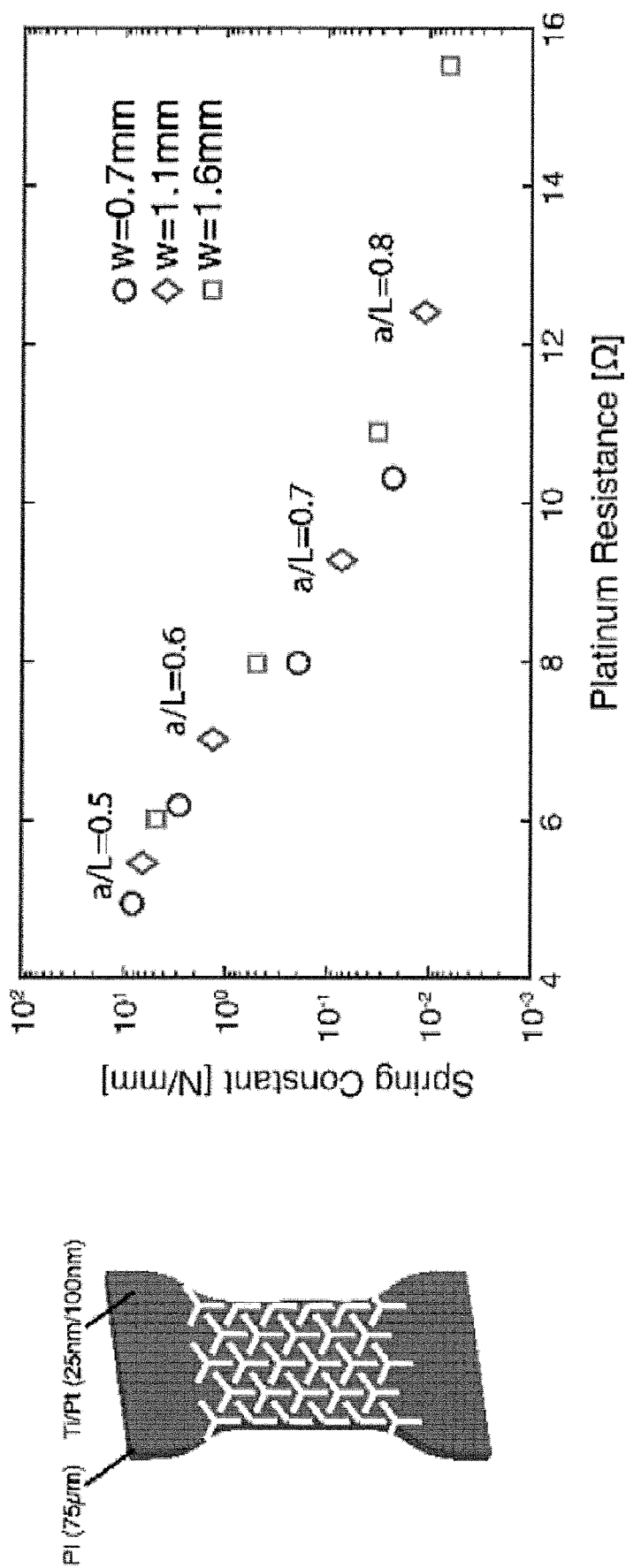
Figure 26B:
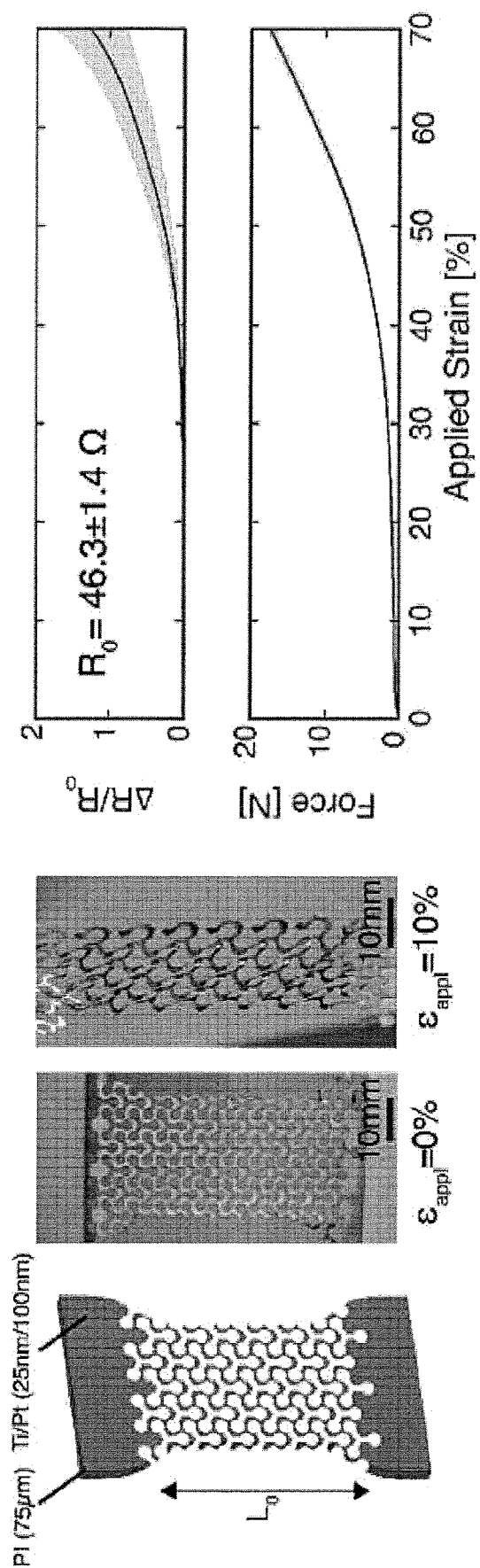
Figure 26C:
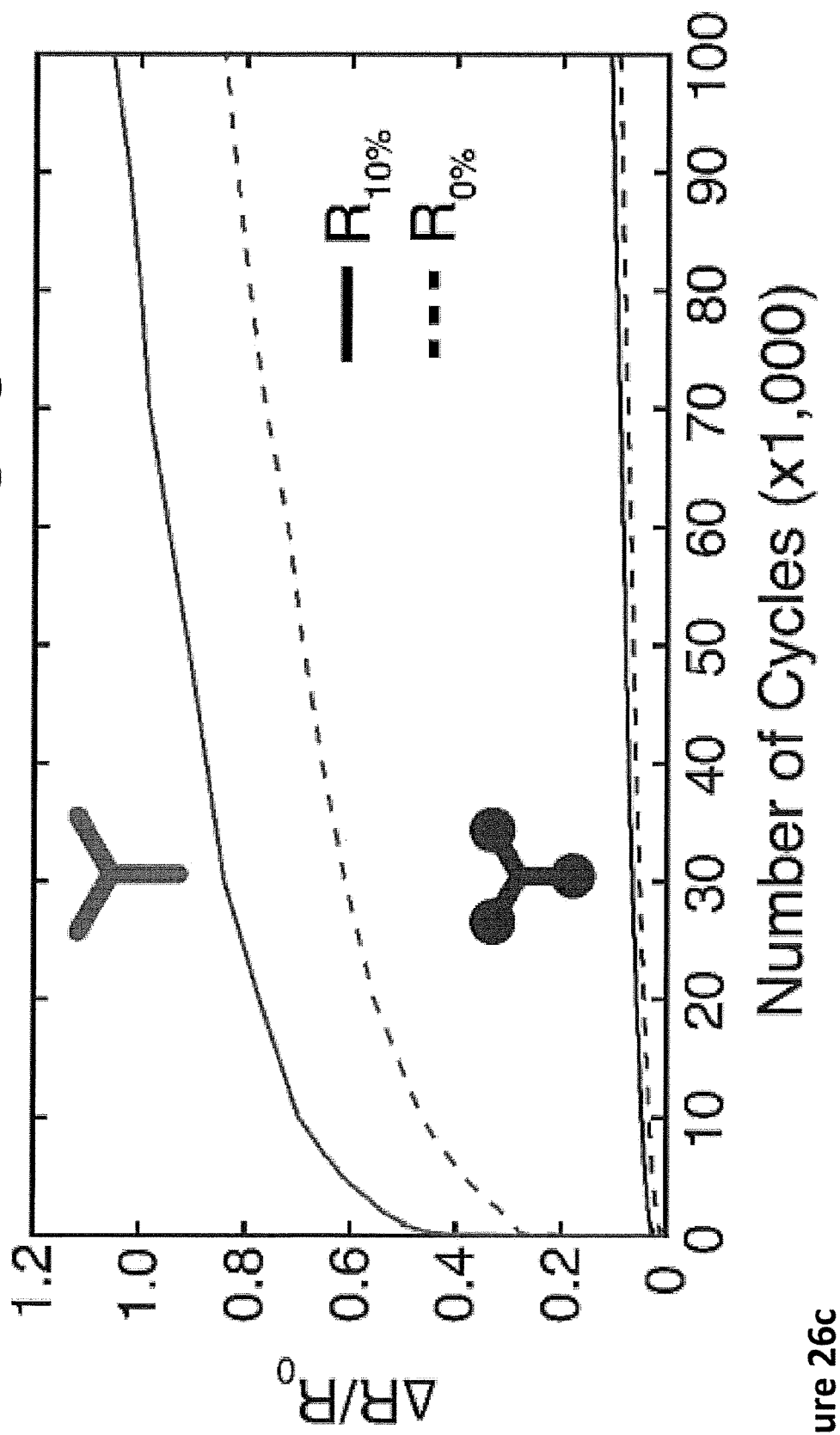
Figure 26D:
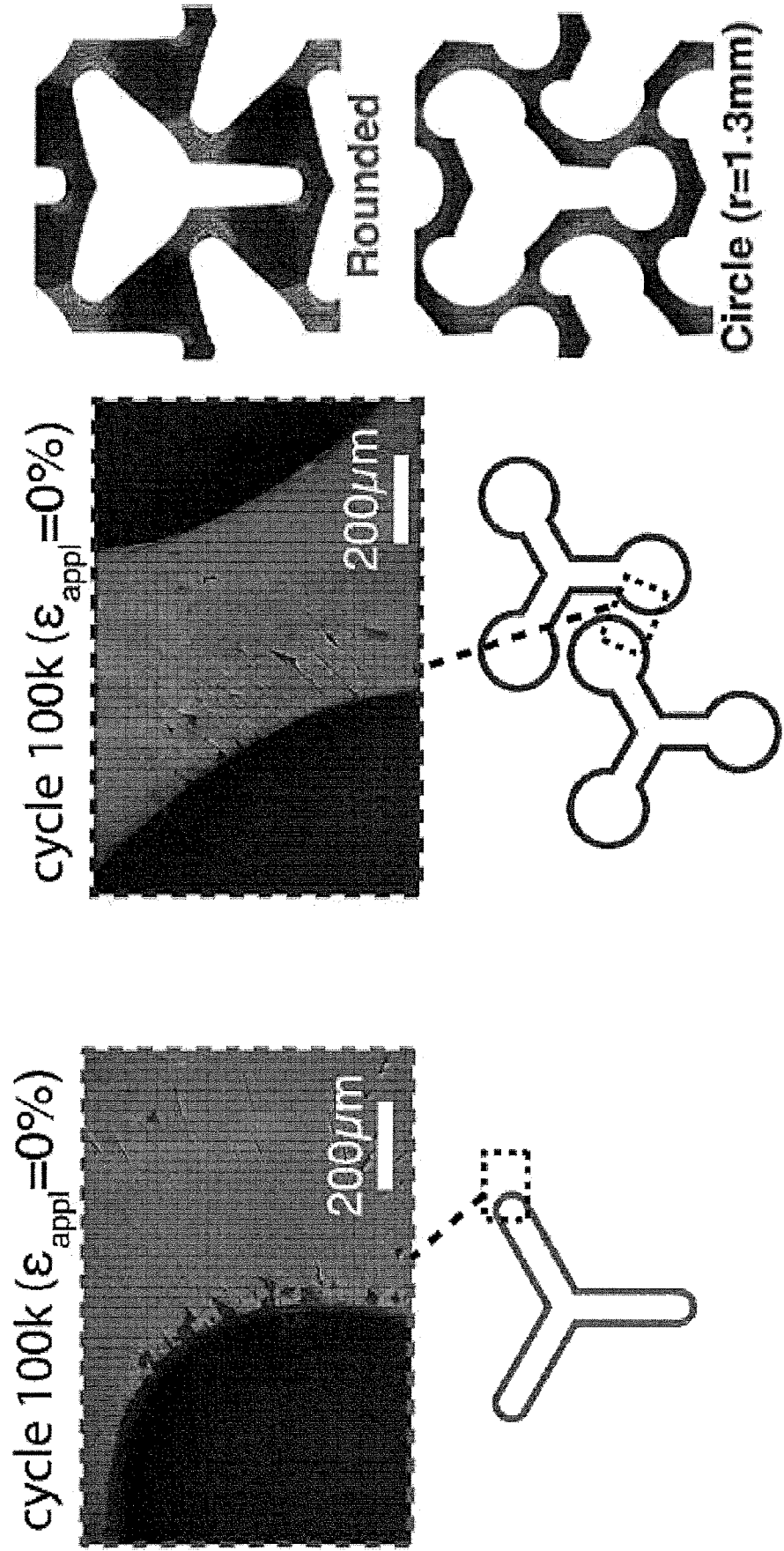
Figure 27:
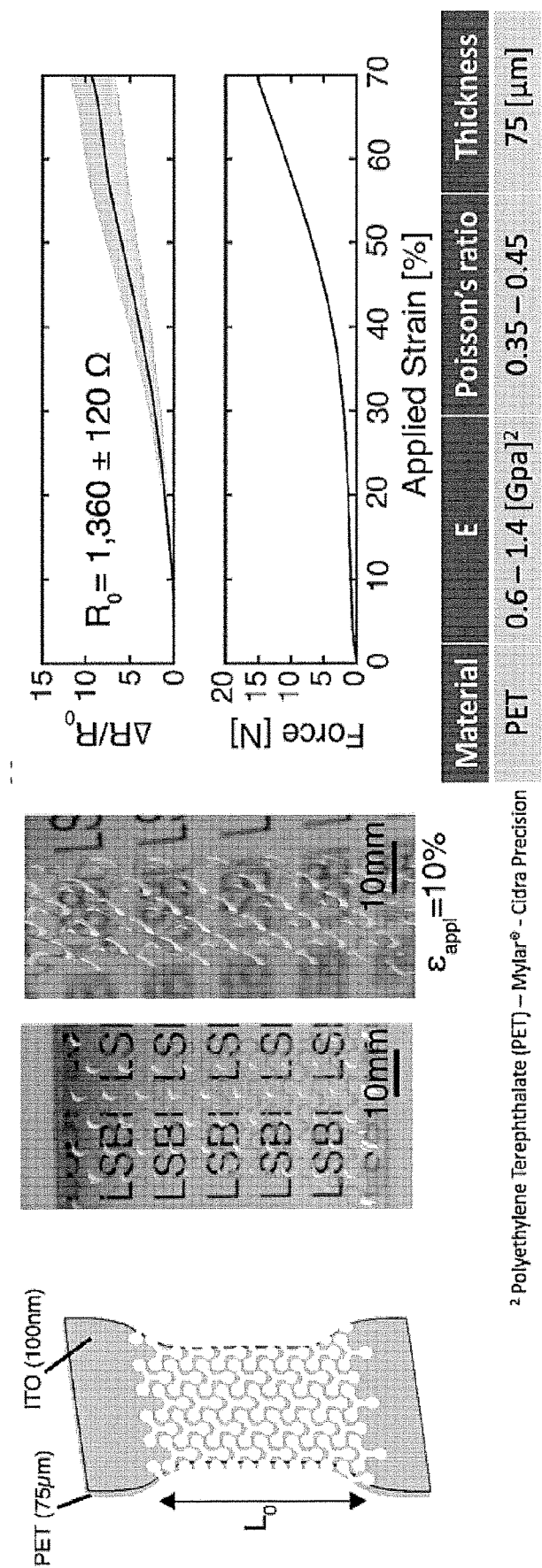
Figure 28A:
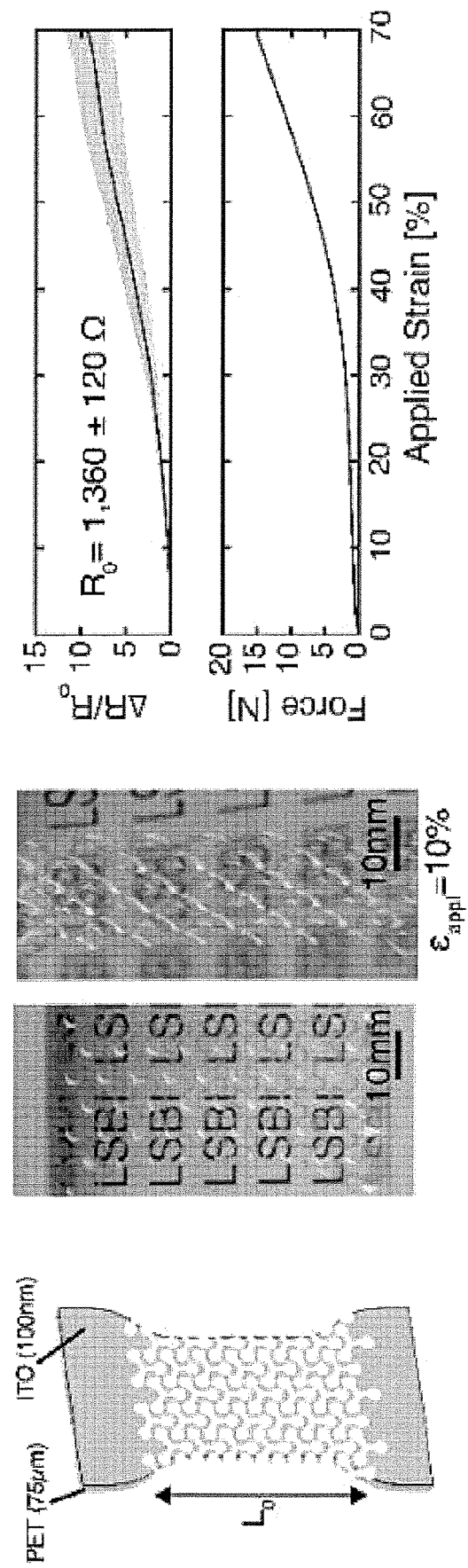
Figure 28B:
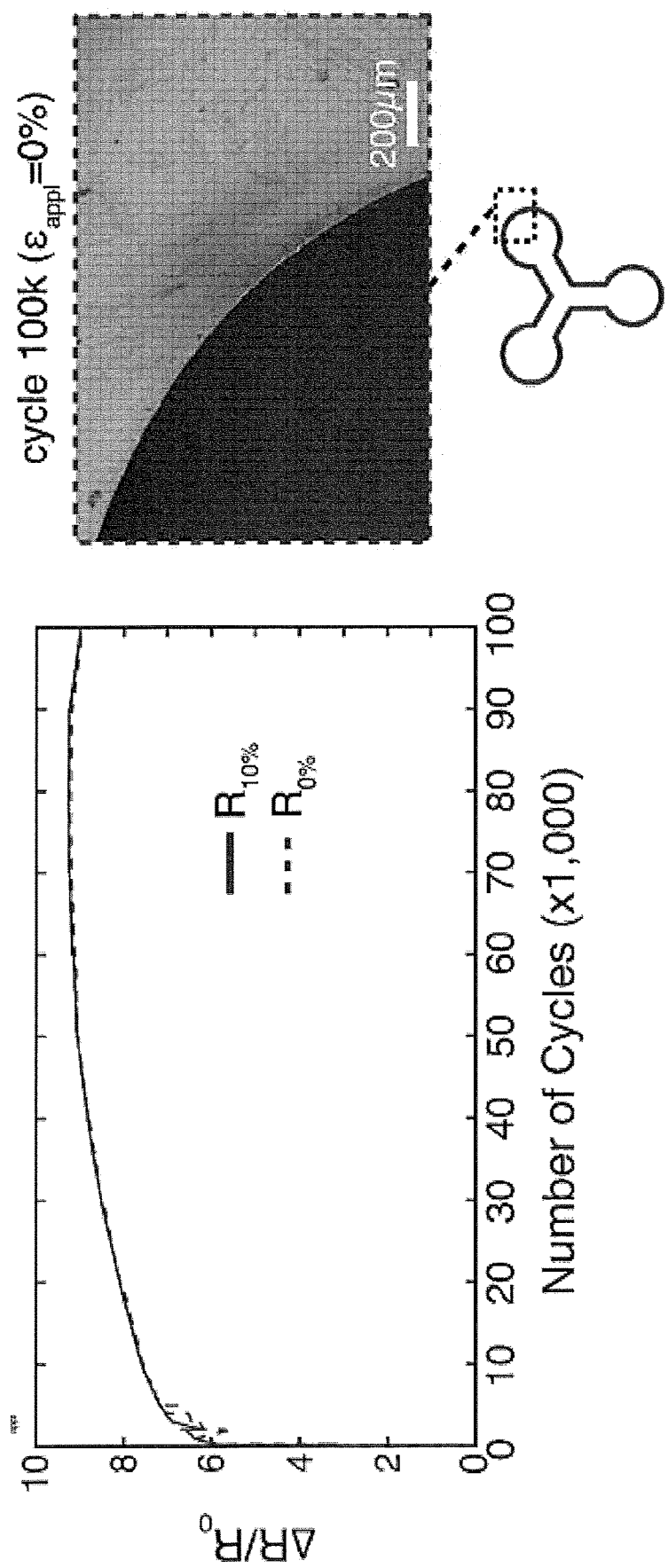
Figure 29:
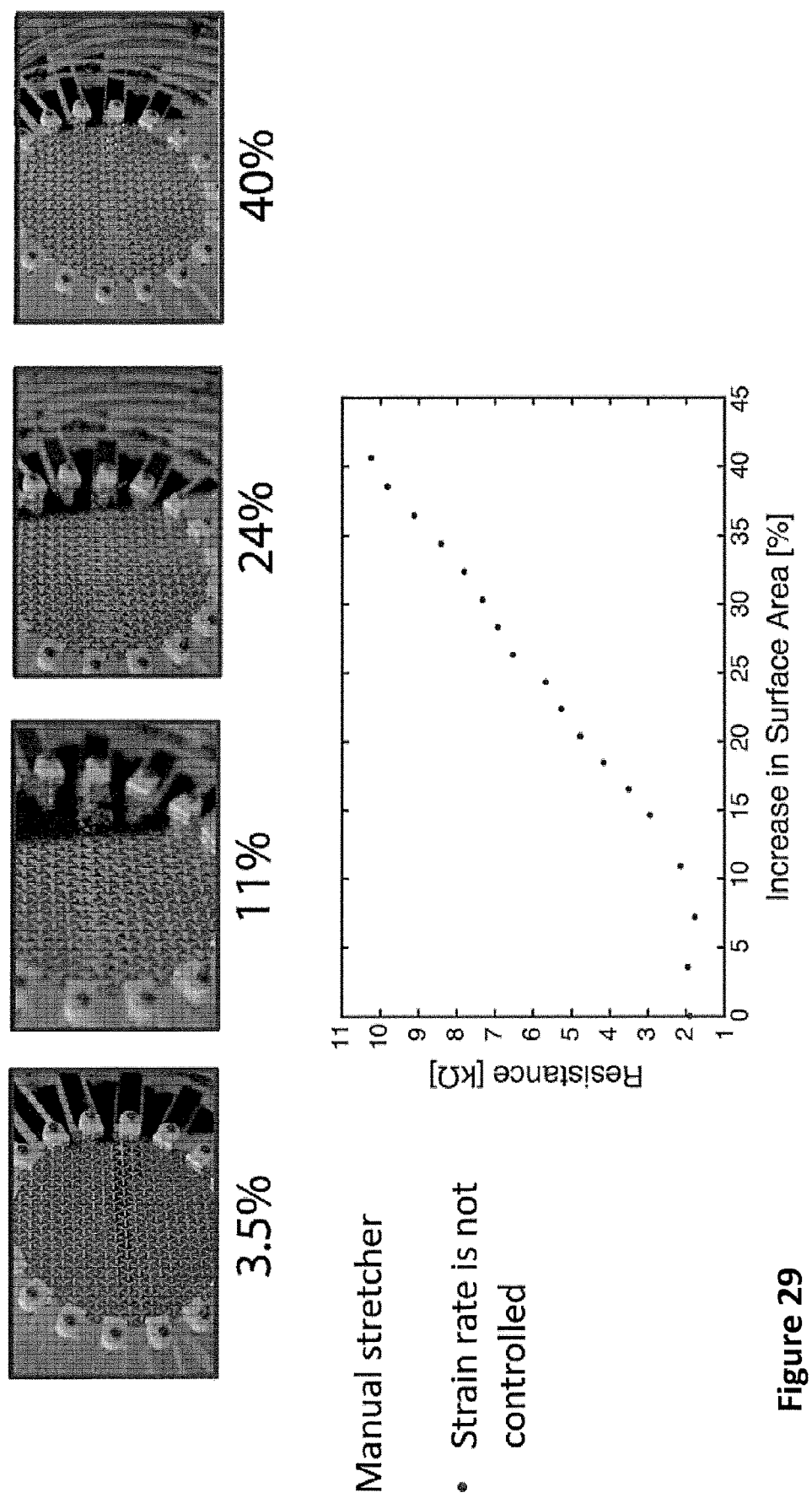
Figure 30:
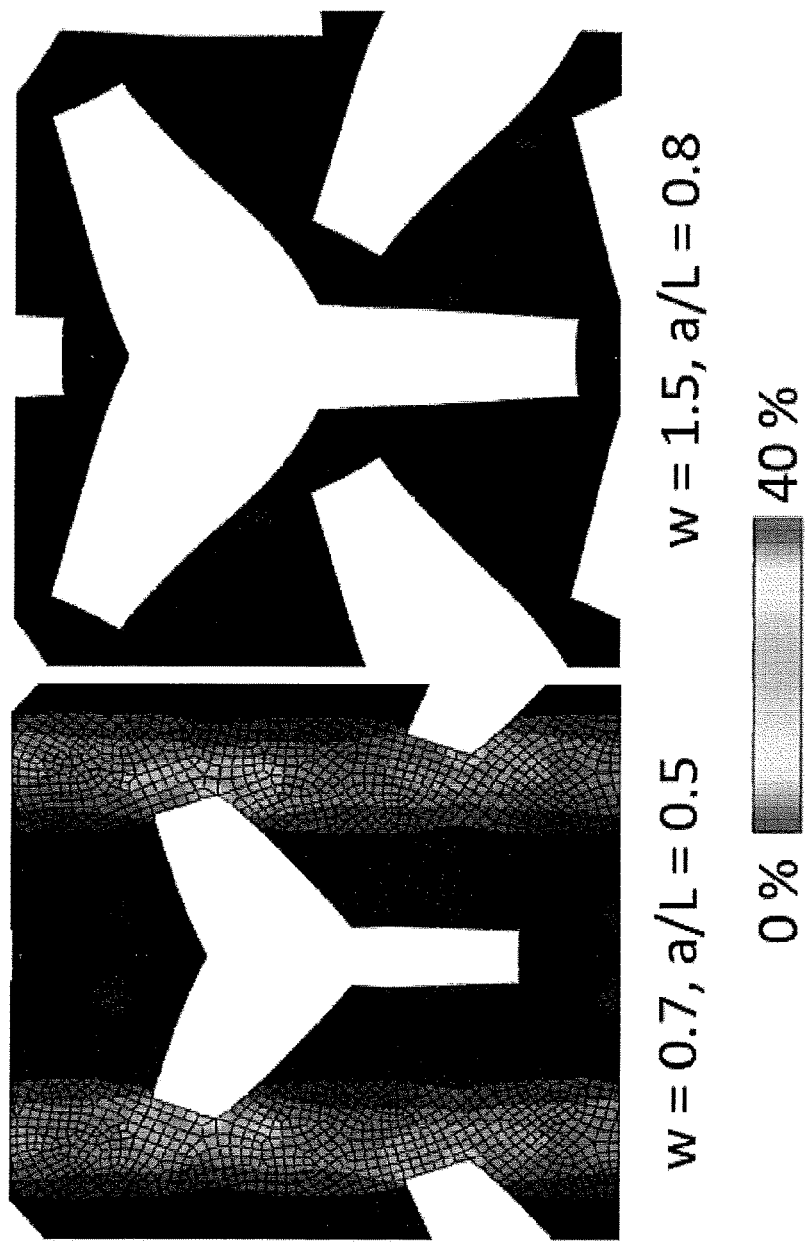
Figure 31:
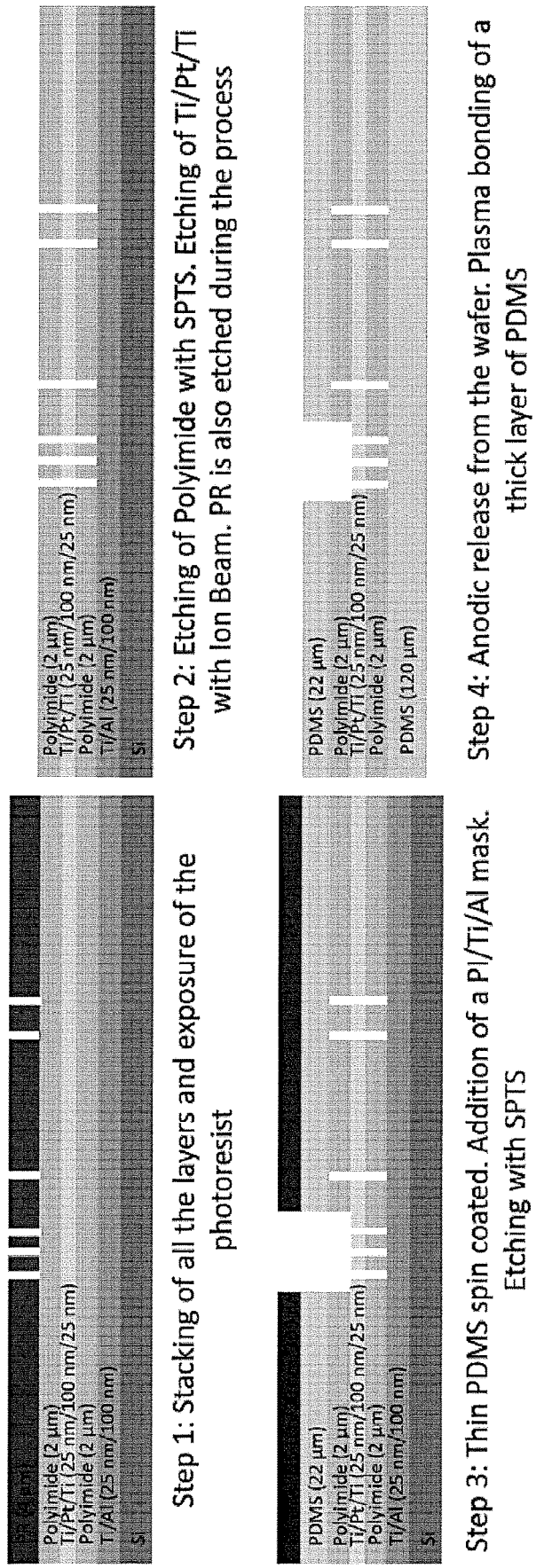
Figure 32:
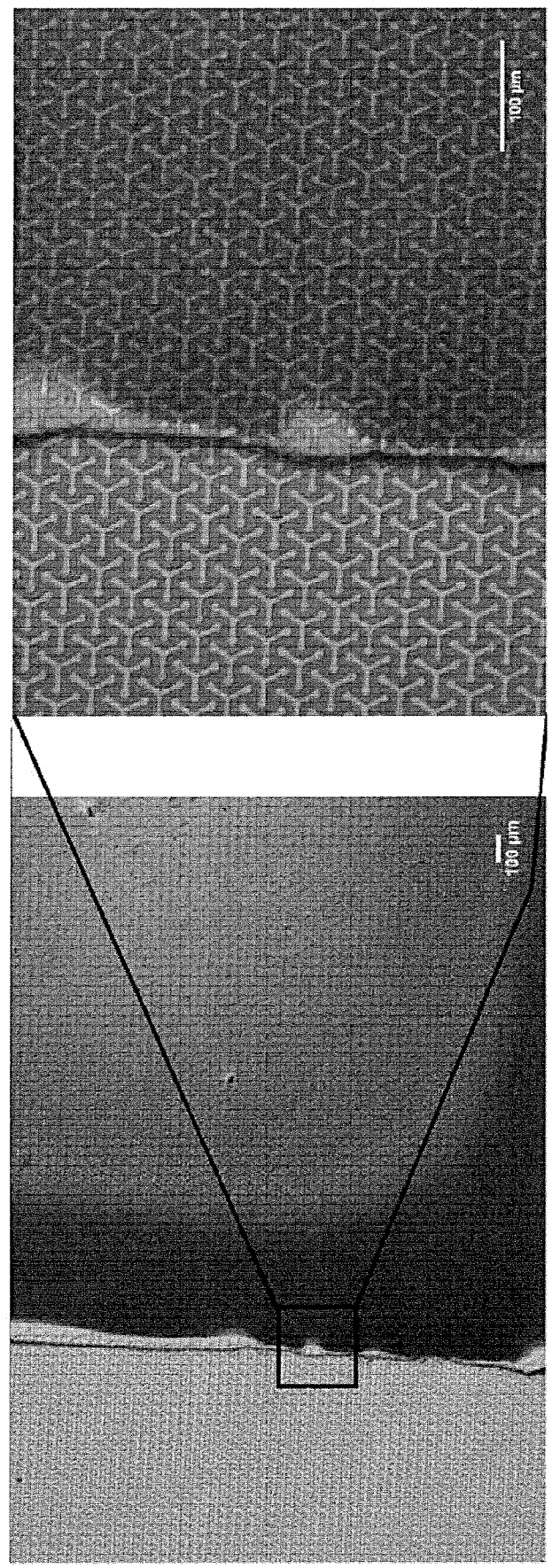

(See FIG. 21 which highlights lower elastic modulus with denser cuts).

As to the Shapes of the Cuts

Most of the tests as reported herewith have been carried out on layers and/or substrates or the like which were engineered by forming Y-shaped cuts into same. However, within the scope of the present invention, cuts with different shapes may be formed as well.

By way of example, Y-shaped cuts may be replaced by multi-branched cuts (with the minimum number of branches being 3). Moreover, into the same layer and/or substrate or the like, cuts with different shapes may be formed; as an example, according to the present invention, a layer and/or substrate or the like, once engineered, may comprise Y shaped cuts along with four branches and/or five branches cuts and so on.

Furthermore, shape does not need to be an isotropic structure (where all branches are of the same length and separated by an equal angle). Lengths of the branches and/or reciprocal orientation thereof may be selected according to the needs and/or circumstances. As an example, elasticity can also be induced if one of the branches (for instance the vertical branch of the Y shaped cuts) is longer than the other two.

Methods

Sample Fabrication

Figure 33:
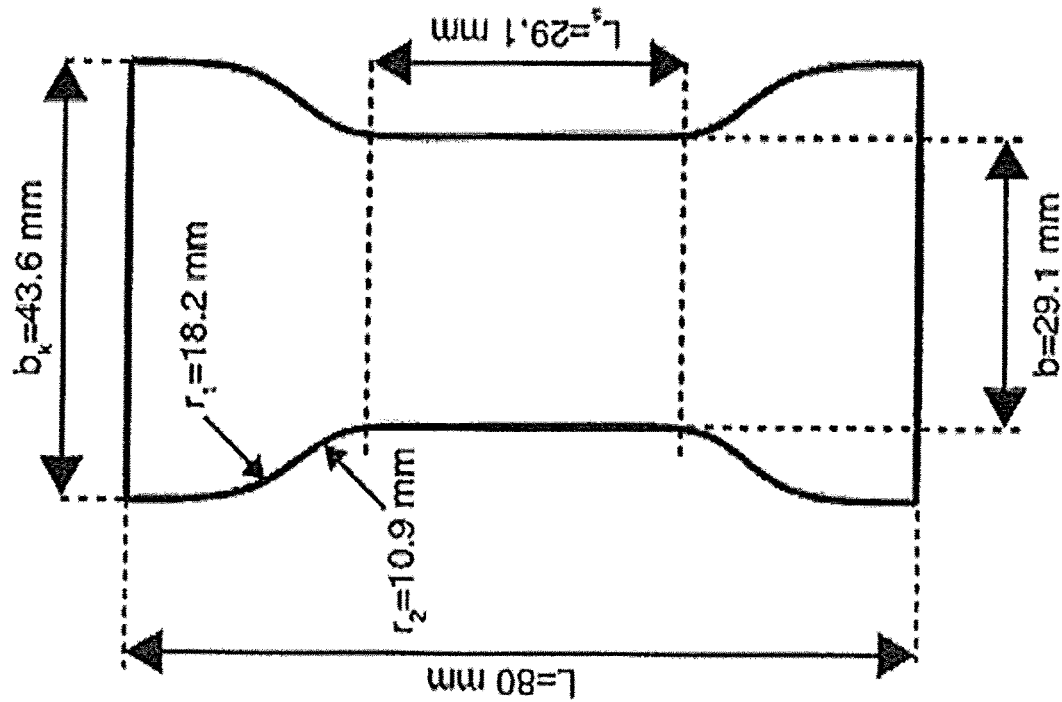
FIGS. 33 and 34 show respectively a plan view of a layer and/or substrate and/or the like and results of radial stretching tests.
Figure 34:
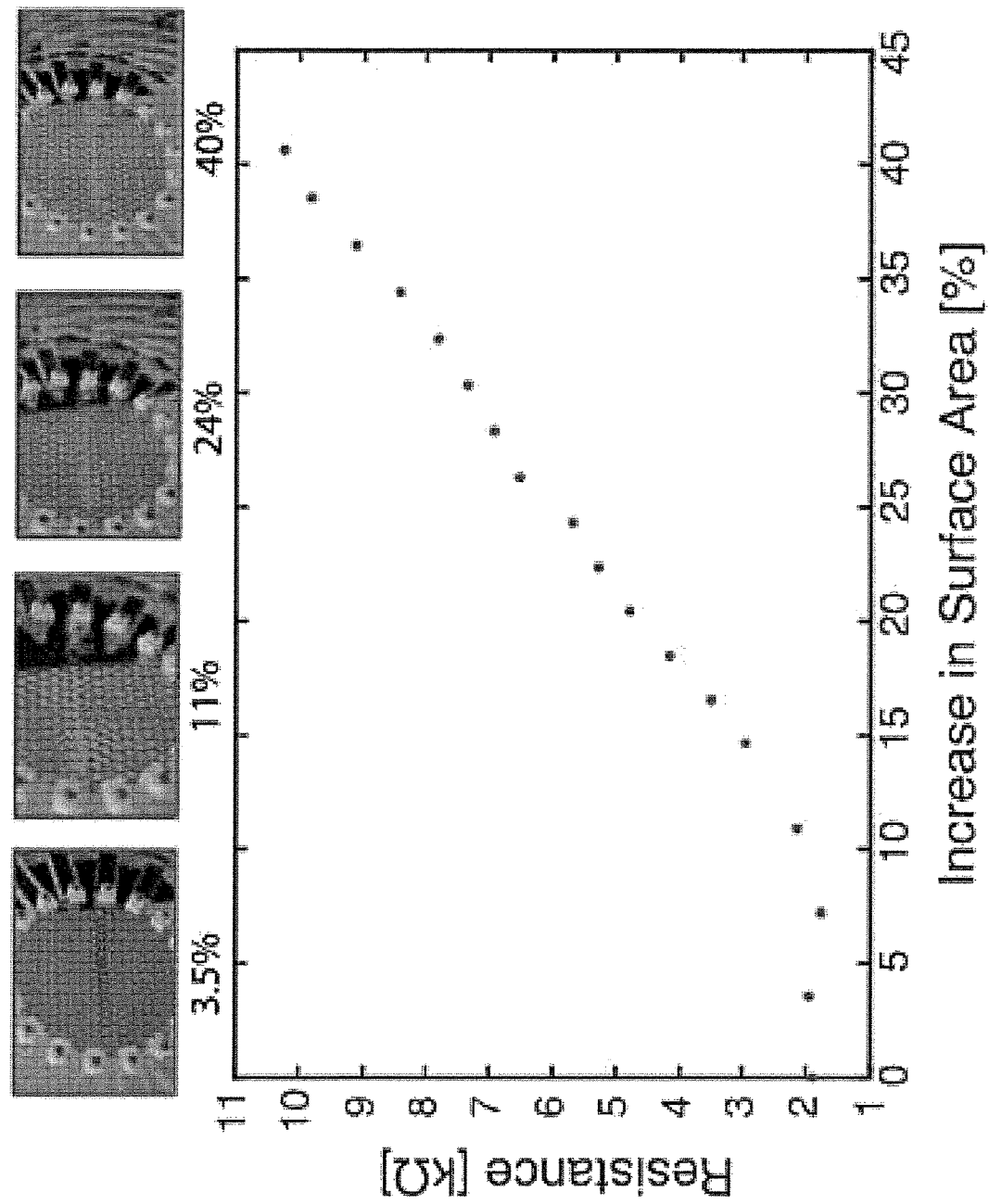

The PI (polyimide, Kapton® HN—Standard Rolls—610 mm wide) and PET (polyethylene terephthalate, Mylar®) films were purchased from Lohmann Technologies. The Y-shaped patterns were cut into the films with a Plotter Cutter (RoboPro CE5000-40-CRP) using a DXF file generated with a MATLAB (R2015b) script. The contour of a dogbone shape (see for instance FIG. 33) was overlayed on the film, with dimensions as shown in FIG. 33, following similar proportions as in the norm DIN 53504. A dogbone was used to have a region of the sample to hold, while allowing the thinnest portion of the dogbone to stretch without risk ripping at the interface of clamp and sample.

For electrically conductive platinum (Pt) samples, an oxygen activation step was first done to improve adhesion on the PI, and followed by the evaporation of a thin layer of 25 nm titanium (Ti). For indium tin oxide (ITO) samples, 100 nm of the conductive material was sputtered on the PET film. The films of PI and PET had a thickness of 75 um.

The PDMS (poly(dimethylsiloxane)) samples were prepared by coating a silicon (Si) wafer with a self-assembled layer of trichloro(1H,1H,2H,2H-perfluorooctyl)silane (Sigma Aldrich) in a dessicator. PDMS (Sylgard 184, Dow Corning, mixed at 10:1 (w:w) with a pre-polymer cross-linker) was then spin-coated on the Si wafers (750 RPM for 35 seconds) and cured at 80° C. for at least 3 hours in a convection oven. The PDMS was then cut out using the same technique as for the PI and PET films with the Plotter Cutter and released manually from the wafer. This technique was able to reliably pattern the Y-shapes onto the film.

Electromechanical Characterization

All samples, except for the bulk PI, were mounted on two clamps for tensile testing on a uniaxial stretcher (MTS Criterion Model 42, with a load cell of 100N maximum capacity) and using a strain rate of 1 mm/s. The samples were securely fastened to the plates of the stretcher by placing double-sided tape on both sides of the film. When the plates moved apart from one another, the dogbone was stretched at a constant and known rate and displacement. For electrically conductive samples, a piece of conductive copper tape was placed on each end of the dogbone, each on which one cable connected to a source meter was attached. This enabled the recording of resistance as the film stretched. The bulk PI was mounted to another uniaxial stretcher for larger force measurements (100 kN MTS 809 axial-torsional servohydraulic testing machine with a load cell of 10 kN). The force-displacement data was measured at a sampling frequency of 100 Hz using the MTS TestSuite TW software. The data was analyzed using MATLAB (R2015b).

For conductive samples, a copper adhesive was taped on each end of the sample and to a Keithley 2400 source-meter for simultaneous resistance measurements.

For figures of mechanical testing, we reported data only up to the maximum strain where all samples survived.

For long-term cycling, the samples were mounted to a homemade uniaxial stretcher and stretched at 10% of their initial length at 1 Hz (1 stretching cycle per second). The resistance was measured using a 4-probe system and a Keithley 2400 source-meter. The stretcher and source-meter were both controlled using custom made software based on Lab View 2015. The resistance is recorded (sampling rate of 5 Hz) and saved only every 10 cycles per decade of cycles.

Scanning Electron Microscopy

SEM images were acquired with a Zeiss Merlin microscope using an annular detector at beam energy of 1 keV.

Finite Element Analysis

The mechanical simulations were performed on the finite element program ABAQUS (6.14) in order to evaluate the effect of the different geometries' parameter. The standard static procedure was used with a damping factor of 1e-7. The S4R element was used with a global mesh size of 0.15 mm and no dependence on the mesh size was observed. Two steps were created with a first step of perturbations applied on three random points and in the direction perpendicular to the film's surface. The perturbations' influence was analyzed and no influence on the force-displacement behavior was observed. The second step consists of a clamped boundary condition on one end and a displacement in the stretching direction on the other end while deactivating the perturbations.

The electrical stimulations were performed with COMSOL (2015) in order to estimate the resistance of a 100 nm thick conductive sheet of platinum, which was cutout with various geometries of the Y-shaped pattern. The ground boundary condition was applied on one end of the sheet and a terminal with 1 A was applied on the other hand. The resulting maximum voltage field was used to estimate the resistance by dividing its value by 1 A.

Results and Discussions

Figure 1:
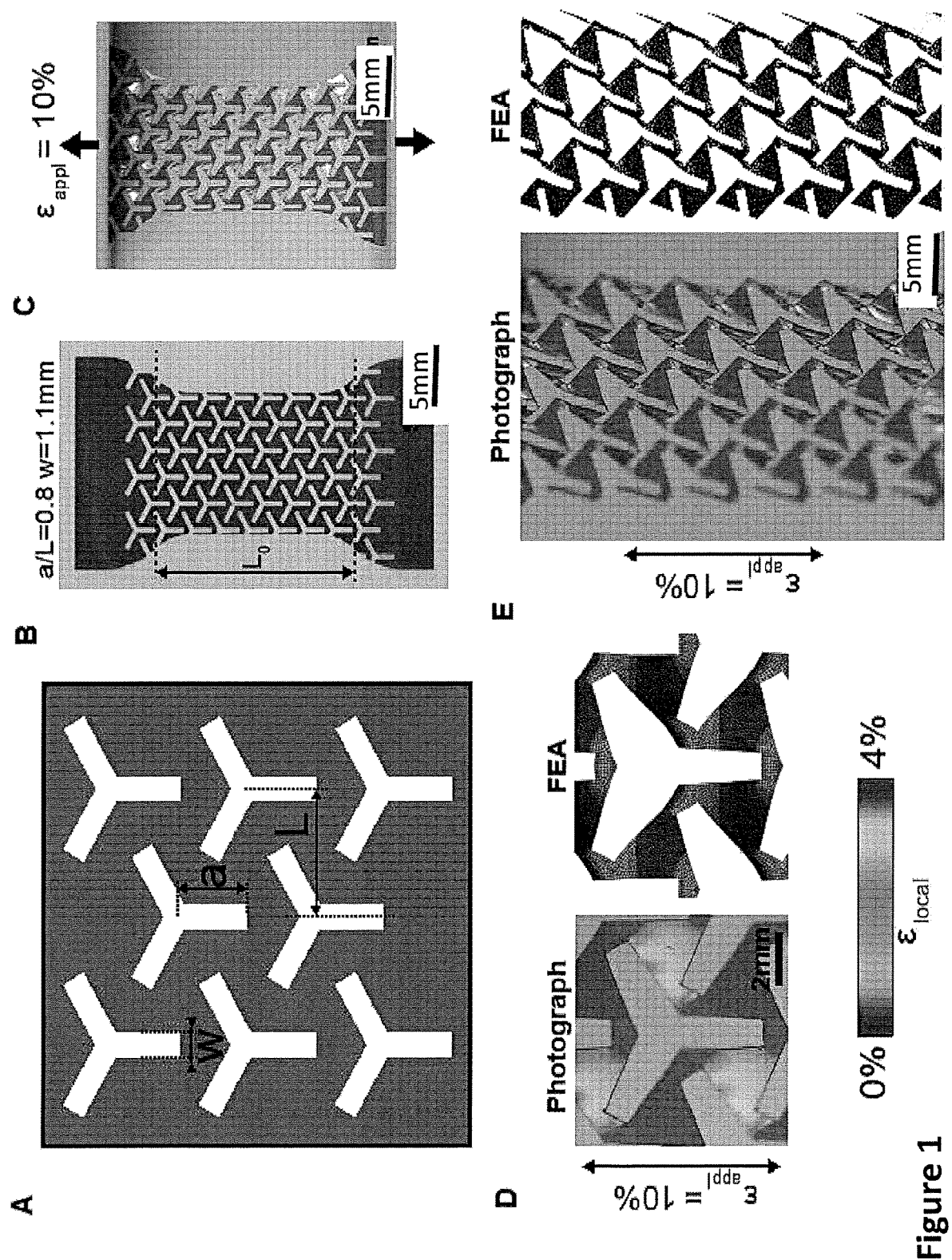
FIGS. 1 to 5 show mechanical behaviors and/or results of materials engineered according to the present invention.

To engineer elasticity in stiff materials, a Y-shaped pattern was designed. Each of the three branches of the Y motif are of equal length (parameter "a") and width ("w"). The Y shapes are spaced such to form a hexagon: the distance between two motif's centers, on the x-axis, is "L" (FIG. 1A). After the motifs were cut in the PI film, the film was cut into the shape of a dogbone with a Plotter Cutter (FIG. 1B). The length of the sample that undergoes stretching and deflection is Lo, and is indicated in FIG. 1B. Both ends of the dogbone were clamped in the plates of the uniaxial stretcher, in order to apply a strain of 10% to the sample at a rate of 1 mm/s. At 10% applied strain, the PI ligaments deflect out-of-plane and locally relieve strain (FIG. 1C). This mechanical behavior of the sample under strain was correctly predicted by a FEA, which supplements the experimental results by offering an estimation of the local strain of various points along the branches. When side-by-side image comparisons of the results from experiment and simulation are done, they show a good correspondence in the regions that undergo maximum levels of strain, as well as the deformations seen during deflection (FIG. 1D, FIG. 1E).

Figure 2:
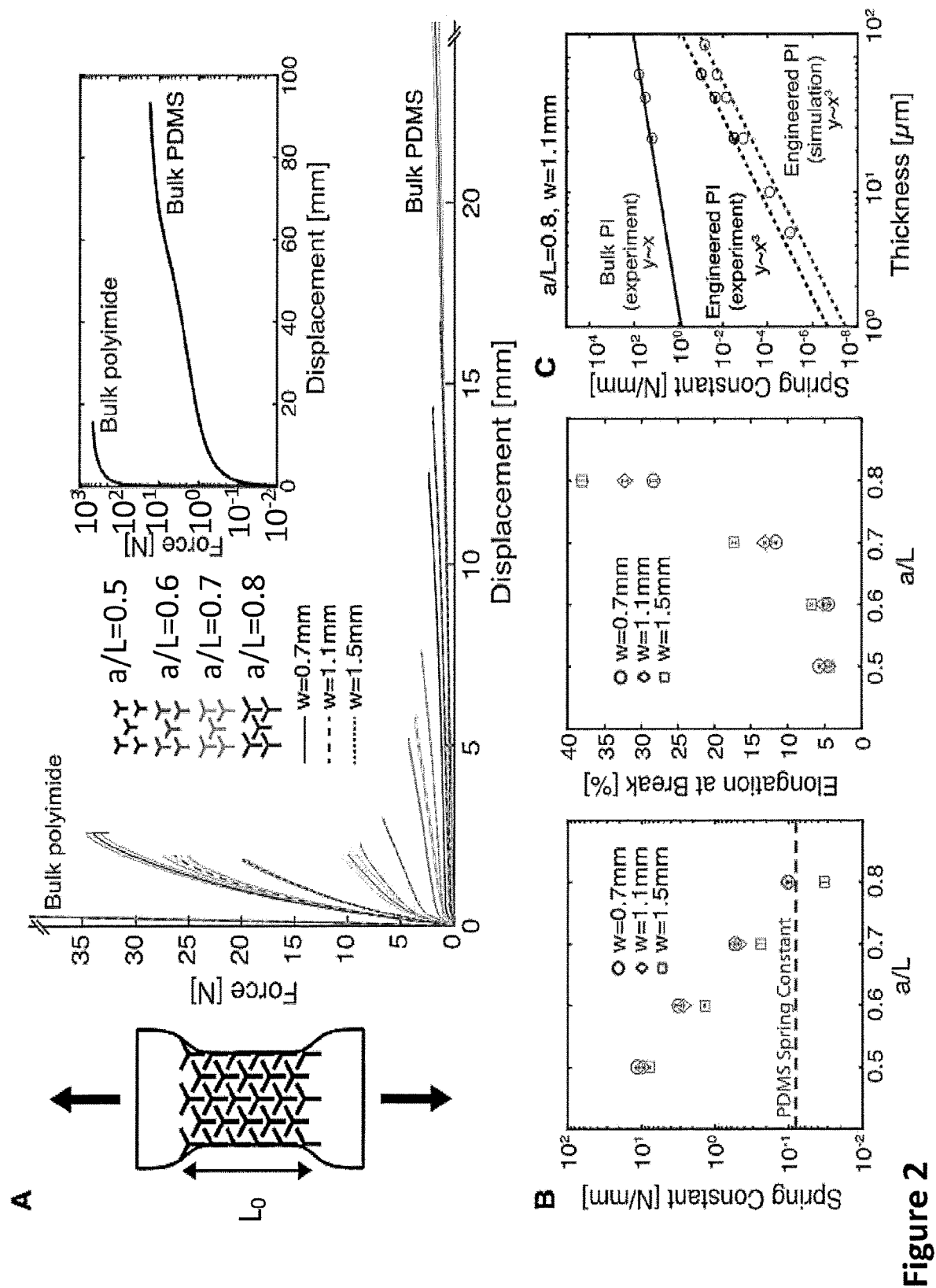

First, the Y-shape motif parameters were optimized. 12 different combinations of a, w, and L were cut and then stretched until failure, which was defined as the time at which the first motif broke. There were 4 different ratios of a/L (0.5, 0.6, 0.7, 0.8) and 3 different values of w (0.7 mm, 1.1 mm, 1.5 mm). Each combination was tested three times, to provide error bars to both the displacement and force at break. Films of bulk (uncut) Kapton and a film of uncut PDMS were also stretched until failure. Each film was 75 urn thick. All 14 force-displacement curves are plotted in FIG. 2A, with an inset showing a comparison of just the two bulk films. It was found that as w and as the ratio of a/L increases the maximum displacement reached by the film increases. The effective spring constant, calculated as the slope of the linear region of the force-displacement curve, diminishes (FIG. 2B, left). This is because the spring constant of the film decreases as the struts between motifs become less wide. For larger values of w, there is a more noticeable change to the spring constant while varying a/L. It is worth mentioning that the spring constant of the bulk PDMS is similar to that of an a/L ratio of 0.8. When comparing the elongation at break, as a function of these variables, it is again seen that the largest w has a more prominent influence on the amount the sample was able to stretch (FIG. 2B, right).

From these three experiments graphs, it was determined that the optimal geometry for the Y-shapes was that of maximum a/L, 0.8, and second largest value of w, 1.1 mm. To understand the effect of film thickness on the spring constant, films of PI of the above given Y-shape parameters were cut on a varying thickness of PI films (25, 50, 75 um). When plotted logarithmically, it was observed that the spring constant scaled as a function of the film thickness, cubed. For comparison, bulk PI of these same thickness was also stretched. Here, the spring constant scaled as a function of the film thickness, only. When the Y-shapes were simulated on PI of different thicknesses (5, 10, 25, 50, 75, 125 um), the observed scaling law on spring constant matched that observed in the experiment. The difference between bulk and engineered PI is thought to come from the buckling and deflection mechanisms seen by the branches, where the force scales in function of the cube of the thickness. The analytical equations of this behavior are out of the scope of this paper, but the experiments match the simulation predictions and we expect a cubic relationship between the spring constant and the thickness, as the bending stiffness scales cubically with thickness.

Figure 3:
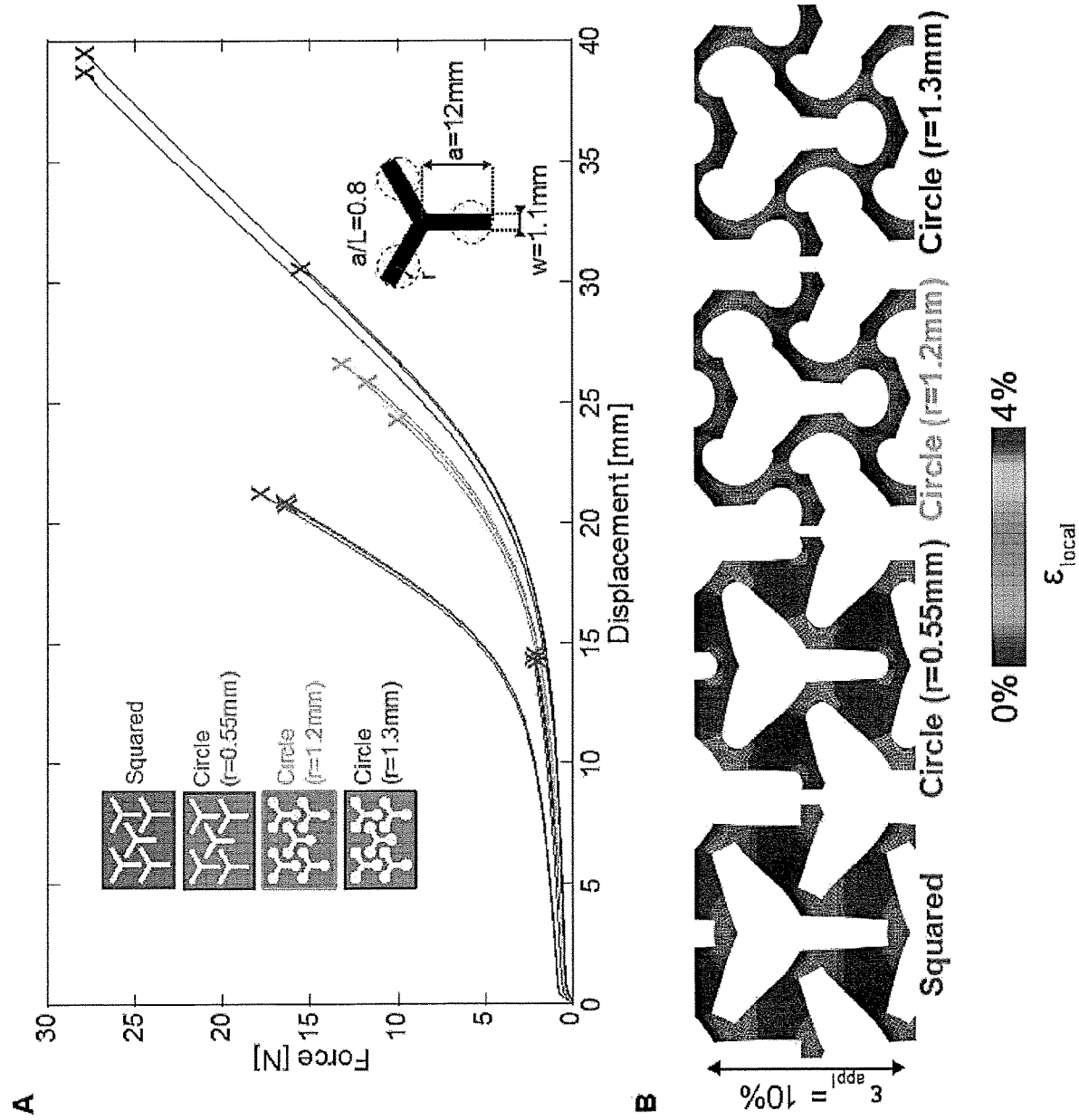

Since the Y-shapes have 90° corners at the end of each branch, this causes high local strains at these right angles. It was hypothesized that rounding the ends would decrease this strain and thus increase the displacement of the film; further, if circles with a diameter larger than the width w were added to the ends of the branches, the elongation at break of the film should increase even more. Four branch end geometries were compared: squared, rounded, circles with radius 1.2 mm, and circles with radius 1.3 mm. For the rounded ends, the corners of the squared ends were simply rounded to avoid sharp bends. The circles were added such that the total length of each branch was unchanged, as indicated in a schematic in FIG. 3A. Because the branch length was the same for all samples, the spring constant of the four samples was relatively unchanged. However, the maximum displacement of the film increases quite substantially for the circles of largest diameter (FIG. 3A). This increase in displacement is thought to be because of a decrease in local strain at the branch ends. The FEA model confirmed that the maximum local strain decreases as circles of larger diameter are added (FIG. 3B). Additionally, with the addition of circles, the strain is better distributed through out the entire Y-shape, and this uniformity probably helps to prevent early failure or delamination that occur from sharp changes in strain. Since the circles of 1.3 mm demonstrated much better mechanical properties, this end branch geometry was used for the majority of the remaining characterization experiments performed.

Figure 4:
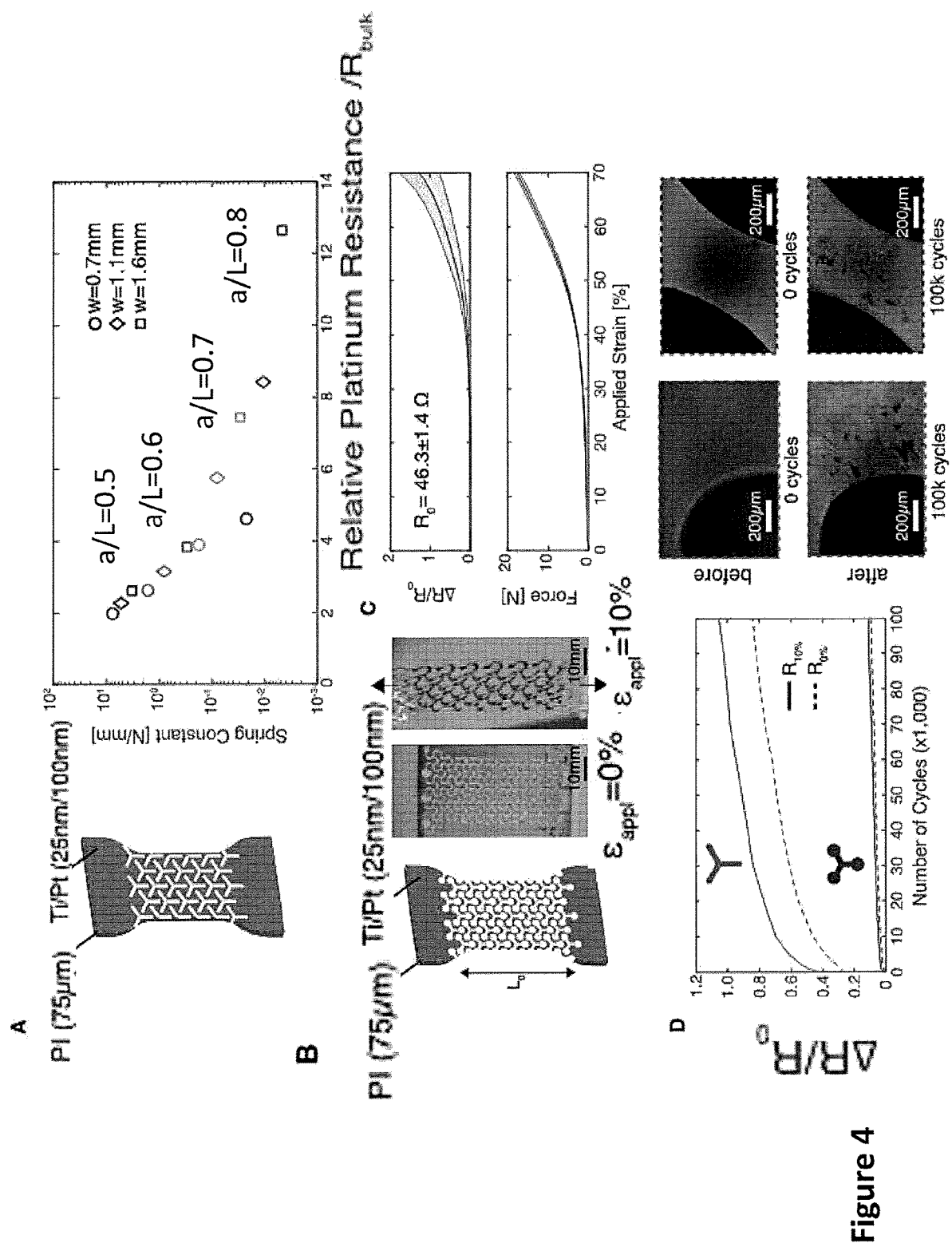

Once a mechanical characterization of the PI films was completed, the effects of the Y-shapes on electrical conductivity was explored. First, a ductile metal, platinum (Pt) was evaporated on one side of the Kapton film, after the cracks had been cut (FIG. 4A). Since a larger surface area of Y-shapes corresponds to smaller amount of material between struts, there is a trade-off geometries of the Y-shapes and the resistance of the film. For the largest w, with an a/L of 0.8, the resistance is almost 3 times larger than for an a/L of 0.5. This is a further justification of why the w of 1.1 mm was chosen, rather than 1.6 mm. One advantage of the Y-shapes is that they stretch, non-preferentially, in all directions, rather than just the direction of the cuts. A circular piece of PI was covered in the Y-shape motifs, and then a band of Ti/Pt was evaporated. The metallization band width was as tall as a motif. After the sample was mounted in a radial biaxial stretcher, the stretcher diameter was increased until there was failure in a motif. The sample was able to increase its area by 40% while still remaining conductive. These results are found in Supplementary Information S2.

After evaporation of the Ti/Pt, the dogbone films were still able to stretch and deflect in the same way as with the Kapton (FIG. 4B). The films, which had motifs with circular ends of radius 1.3 mm, were stretched on the uniaxial stretcher, and were able to stretch up to 70% was recorded before experiencing failure, while still remaining conductive. All samples failed first mechanically before electrically (FIG. 4C). To investigate the robustness of the films, they were stretched for 100,000 cycles at an applied strain of 10%. The circular end (r=1.3 mm) samples were plotted and compared to the rounded end samples (FIG. 4D). In the solid line is the resistance at 10% applied strain, and in the dashed line is the resistance at 0% applied strain, for each cycle. In both the rounded and circular ends, there is a difference between solid and dashed line, yet this gap is proportionally larger for the rounded samples. While the rounded undergo an increase in resistance of about 50% from start to finish, the circular samples see an increase of ~10%. From the simulations, shown in FIG. 3B, the Y-shape regions of maximum strain can be identified. These areas were imaged under the SEM, and indeed regions of delamination and cracks can be seen, whereas the rest of the sample looked unaffected (Supplementary Information). The rounded sample had significantly more delamination and in a greater amount of the film. The sample with circular ends had a few cracks in the film, but little delamination.

Figure 5:
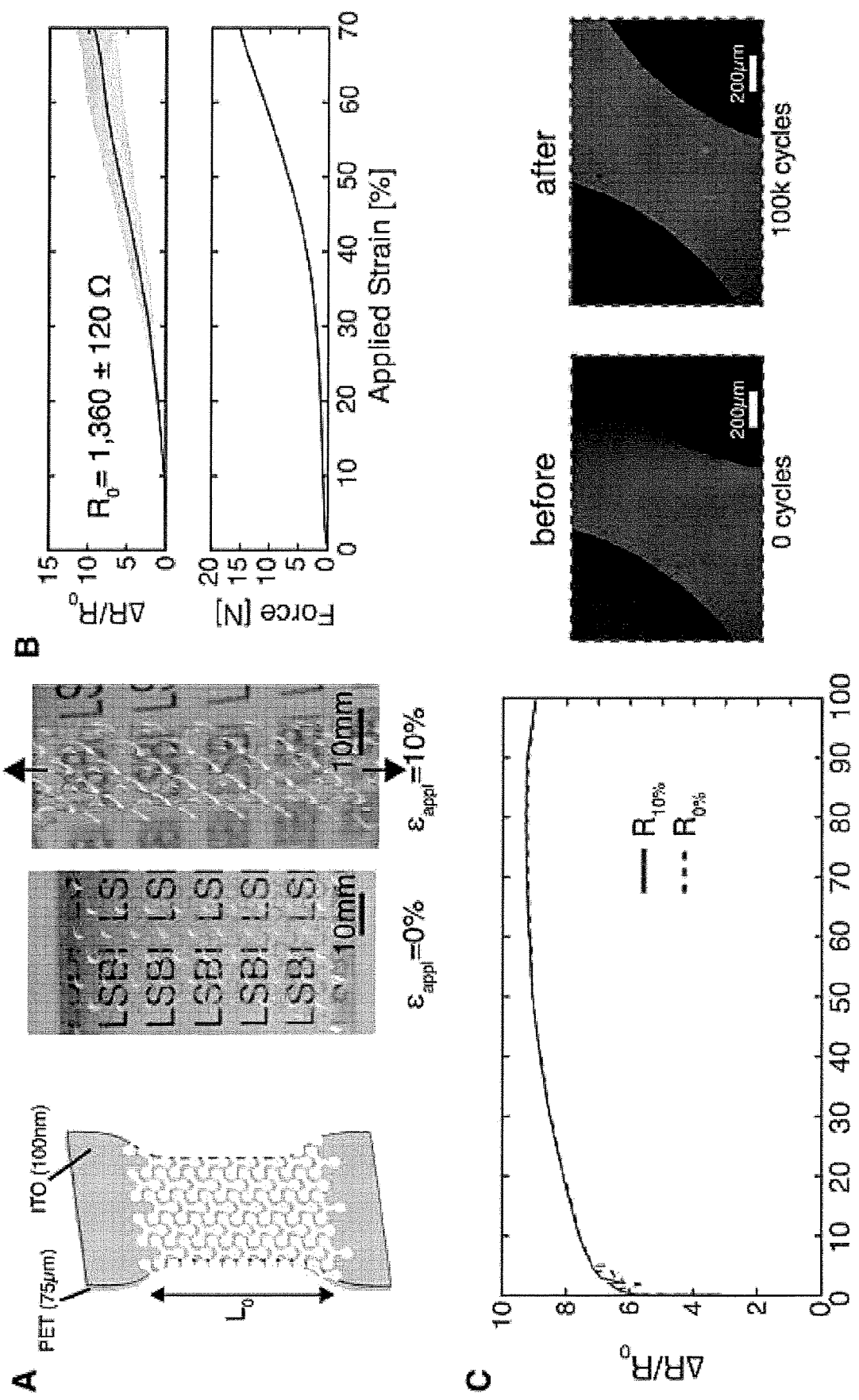

To demonstrate the effectiveness of this approach to engineer elasticity in brittle films, which typically fail after an applied strain of 5%, indium tin oxide (ITO) was sputtered on the top layer of a PET film, after the Y-shapes had been cut into the polymer (FIG. 5A). After the deposition of the conductive material, the sample was mounted to the uniaxial stretcher, as with the previous samples, and stretched to an applied strain of 10%. As the sample was stretched, it underwent the same mechanical deformations as described before (FIG. 5B). The resistance of the film was measured as it was stretched up to 70% (FIG. 5C). Here, while the sample still remained electrically conductive, an increase of ~10 times was observed in the resistance. This was hypothesized to be from the brittle nature of the film, and the formation of very small cracks that delaminated during the elongation. Unlike with the Pt, the ITO exhibits electrical failure before it shows signs of mechanical failure. At an applied strain of 40%, the resistance in the film is almost 5 times greater while the mechanical force at this strain level barely increased. The ITO-PET film was also cycled 100,000 times at 10% applied strain (FIG. 5D). Within the first few cycles, the resistance increased by a factor of 6, possibly due to the formation of small cracks in the ITO. However, after this jump, the resistance remained much more stable and, by the end of the 100,000 cycles, had increased less than a factor of 2. With the ITO, the gap between resistance at 0% and 10% applied strain is much smaller than that observed in the Pt. When the film was imaged under the SEM, no obvious regions of large cracks, delamination or failure were identified. There were some portions that looked 'scratched' or a bit darker, which could correspond to a thinner and thus less conductive amount of ITO.

CONCLUSIONS

In summary, we have demonstrated a novel approach to patterning both single and multi-layer, multi-material foils, to engineer elasticity in these films. We performed a systematic study of the electromechanical effects on ductile and brittle electrically conductive materials, as well as an extensive analysis of different geometrical factors that affect local strain and the out-of-plane deflections. Due to the nature of the Y-shaped motifs, which have parameters that are smaller than those of the overall film design, the motif can be overlaid onto any design. Additionally, the technique of cutting the patterns can be used on virtually any material(s), showing potentials for various applications.

The structures were also confirmed using Finite Element Modeling. Upon stretching, the PI ligaments locally deflect out of plane, allowing the foil to macroscopically stretch. The effective spring constant of the engineered PI can be reduced by two orders of magnitude allowing us to nearly match the spring constant of a silicone elastomer of equivalent thickness (75 µm). The engineered films demonstrated no preferential direction of stretching. We applied our motif to ductile platinum (Pt) films on PI foils and brittle ITO (indium tin oxide) films on PET (Polyethylene Terephthalate) foils. The Pt/PI system maintained stable electrical conduction when stretched up to an engineered strain of up to 70%. Moreover, it withstood 100,000 stretch cycles at 10% applied strain, without undergoing electromechanical fatigue. Similarly, the ITO/PET structure stretched up to a maximum 50% uniaxial strain, and kept its electrically and mechanically integrity after a 10000 stretch cycle at 10% applied strain. The proposed design is versatile and compatible with thin-film processing. We anticipate the patterned motifs can be scaled down to offer a wider range of elastic electronic materials to be used in stretchable electronics and soft bioelectronics.

The invention offers a generic design and associated processes and materials enabling in a hexagonal pattern reversible elasticity in films or membranes that are initially inextensible. The distribution of repeated through-hole patterns within a non-elastic multilayered membrane programs reversible elasticity within the said initially inextensible membrane. The through-hole patterns are replicated 2D (planar) closed shapes open in the multilayered membrane. Upon mechanical loading, the contour of the through-hole patterns deforms by moving out of its initial plane thereby enabling substantial mechanical deformation. This method can be applied to a single material and uniform membrane but also to multilayered, multi-material stacks.

The design is valid across scales (macro-to nanoscale) and compatible with any materials, which can be initially laid or manufactured into a film i.e. a uniform planar membrane for which one of its three dimensions is several orders of magnitude smaller than the other two. Examples of such materials include plastics, paper, metals, elastomers, semiconductors. The design is suitable for both ductile (e.g. Platinum) and brittle (e.g. indium-tin oxide—ITO) materials.

Figures 37, 38:
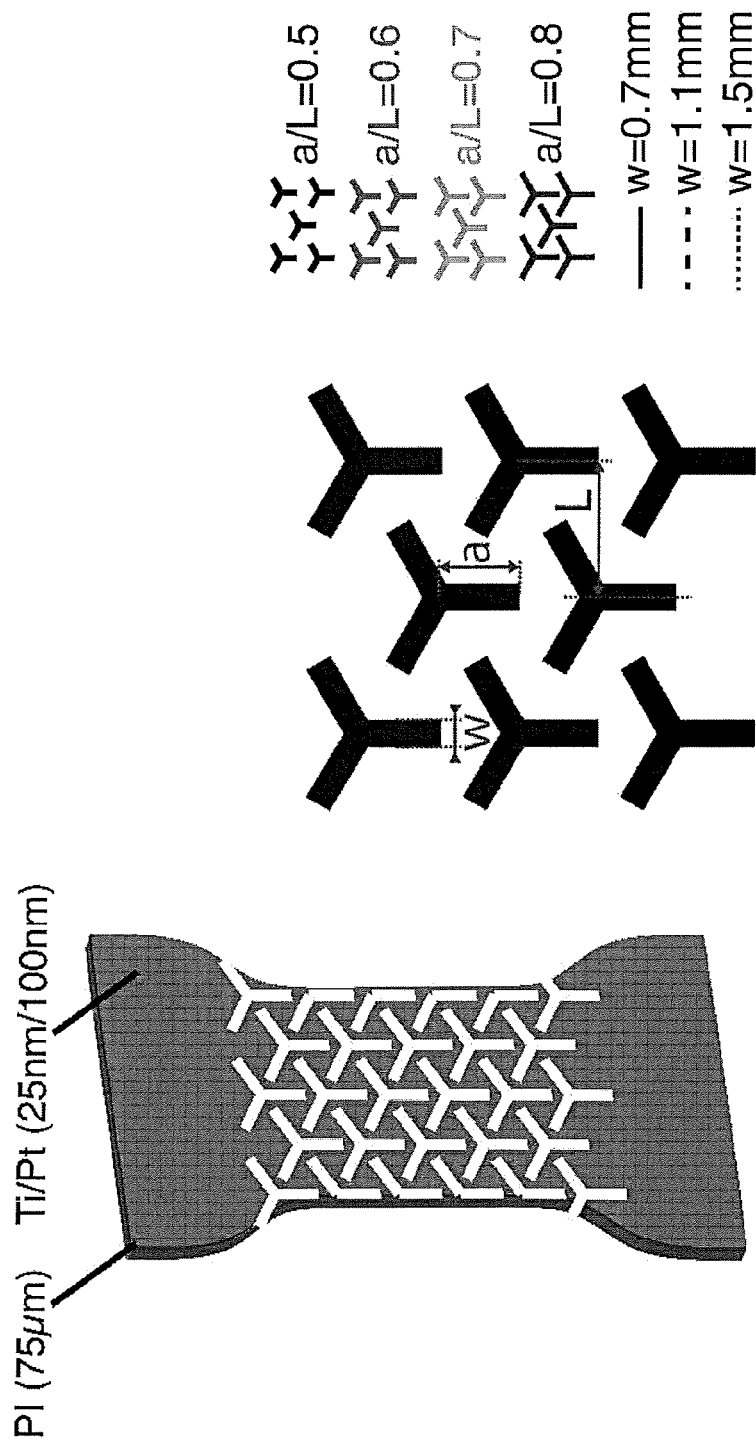
FIG. 37 shows an example of a suitable through-hole motif that is a "Y" or tri-branched, equidistant shape.
FIG. 38 shows a structure patterned with a myriad of tri-branched through-the-thickness openings that are not connected to each other, characterized by a branch width and length.

An example of a suitable through-hole motif is a "Y" or tri-branched, equidistant shape. See FIG. 37. The motif can be distributed across the 2D surface and may be uniform across the 2D surface or not.

The through-hole pattern and distribution are further optimized against the structure stiffness and electrical properties.

Multilayered structure consisting of at least three layers where the outer layers are electrically insulating polymers and at least one layer is a film of electrically conductive or semiconducting material.

The structure may be freestanding or bonded to or embedded in an elastic carrier. Each layer is well bonded to its neighboring ones. An adhesion layer or coating may be deposited on each side of the structure to ensure irreversible bonding with the elastic carrier.

The structure is patterned with a myriad of tri-branched through-the-thickness openings, which are not connected to each other. The shape of the tri-branched unit cell is characterized by the branch width and length. See FIG. 38. In particular, the branch width ("w") and the ratio between the branch length and the distance between the main axis of each patterned element ("a/L") are considered to be important parameters.

Figure 39:
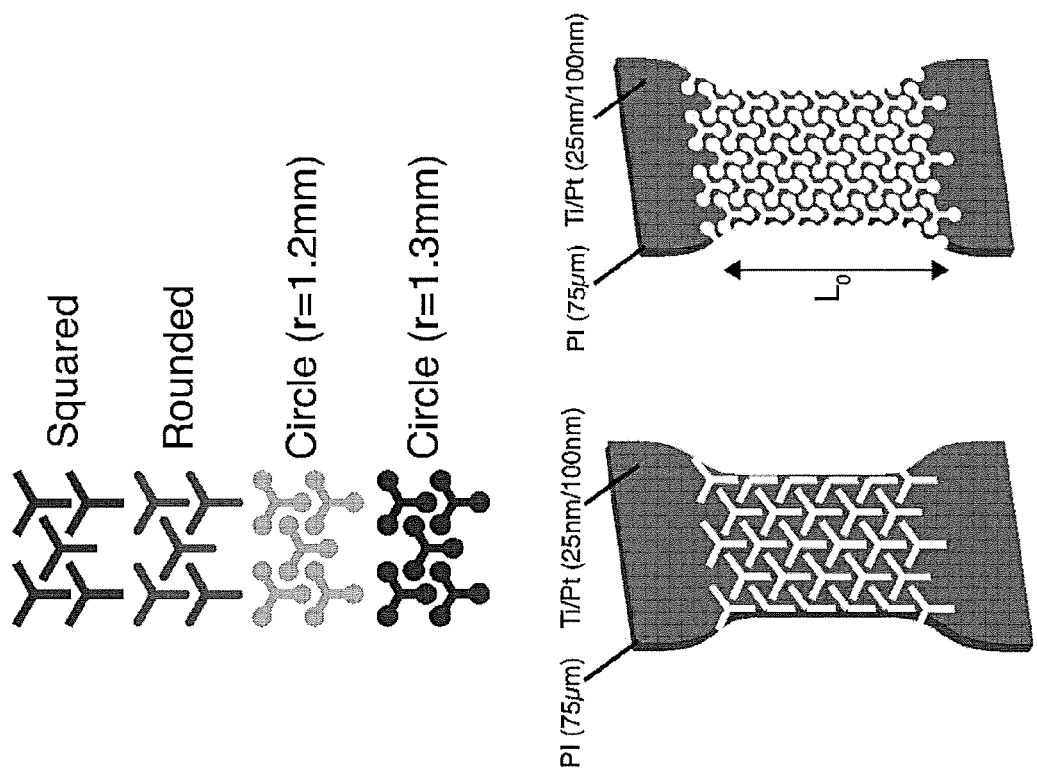
FIG. 39 shows the tri-branched structures in which the endings of each branch are terminated as a square, round, or circular shape.

The endings of each branch may be terminated as a square, round, circular shape. See FIG. 39. The diameter or side of this shape would be at least equal to the width of the branch. The tri-branched cell is replicated about the surface of the structure in a square, hexagonal arrangement. The fill factor of the surface is at least 25%.

The through-hole structure is reversibly deformable in one or multiple directions, in the plane or out-of-the plane. The embedded electronic film(s) maintain finite electrical conductivity, whichever the applied deformation.

It has therefore been demonstrated with the above description that the present invention allow to obtain the wished results, thus overcoming the drawbacks affecting the prior art.

While the present invention has been clarified by means of the above description of some embodiments, the present invention is not limited to the embodiments depicted in the drawings and/or described above.

The invention claimed is:

1. A multilayer substrate comprising:
   at least a bottom layer of electrically isolating, intrinsically non-elastic material and, on said bottom layer, a top layer of electrically conductive, intrinsically non-elastic material, said bottom and top layers forming opposite exposed main surfaces of the multilayer substrate;
   a plurality of through cuts each extending through a thickness of each of said bottom and top layers, the plurality of through cuts in an unstretched state forming a pattern of open surface areas in the opposite exposed main surfaces of the multilayer substrate;
   wherein each of said through cuts has projections on the opposite exposed main surfaces of said multilayer substrate, and the projections are shaped so as to comprise at least three branches extending from a common portion, each branch having a length and a width that form said open surface areas.

2. The multilayer substrate as claimed in claim 1, wherein, on said opposite exposed main surfaces of said multilayer substrate, at least two of the branches of at least one of said through cuts are of equal length.

3. The multilayer substrate as claimed in claim 1, wherein, on said opposite exposed main surfaces of said multilayer substrate, at least two of the branches of at least one of said through cuts have equal width.

4. The multilayer substrate as claimed in claim 1, wherein, on said opposite exposed main surfaces of said multilayer substrate, each of the branches of at least one of said through cuts has a width between 100 nm and 1 cm.

5. The multilayer substrate as claimed in claim 1, wherein said multilayer substrate extends along a length direction (X) and a width direction (Y) substantially perpendicular to said length direction (X), and wherein, on said opposite exposed main surfaces of said multilayer substrate, for at least two of said through cuts, two respective branches extend along a direction which is parallel to one of said directions (X) or (Y).

6. The multilayer substrate as claimed in claim 1, wherein, on said opposite exposed main surfaces of said multilayer substrate, the plurality of through cuts includes N through cuts/cm$^2$, with N ranging from 2 to 100,000,000.

7. The multilayer substrate as claimed in claim 1, wherein the thickness of said bottom layer is comprised between 1 nm and 500 µm.

8. The multilayer substrate as claimed in claim 1, wherein said top layer is formed of a conductive metal oxide.

9. The multilayer substrate as claimed in claim 1, wherein the thickness of said top layer is comprised between 1 nm and 500 µm.

10. The multilayer substrate as claimed in claim 1, wherein the multilayer substrate forms a stretchable electrode.

11. The multilayer substrate as claimed in claim 1, wherein a transparency of the opposite exposed main surfaces of the multilayer substrate, which is a ratio between the open surface areas over a total surface area, ranges from 25% to 90%.

12. A method for engineering elasticity, said method comprising:
providing a multilayer substrate comprising at least a bottom layer of electrically isolating, intrinsically non-elastic material and, on said bottom layer, a top layer of electrically conductive, intrinsically non-elastic material, said bottom and top layers forming opposite exposed main surfaces of the multilayer substrate;
forming a plurality of through cuts in said multilayer substrate, each through cut extending through a thickness of each of said bottom and top layers, the plurality of through cuts in an unstretched state forming a pattern of open surface areas in the opposite exposed main surfaces of the multilayer substrate;
wherein each of said through cuts has projections on the opposite exposed main surfaces of said multilayer substrate and the projections are shaped so as to comprise at least three branches extending from a common portion, each branch having a length and a width that form said open surface areas.

13. The method as claimed in claim 12, wherein forming said plurality of through cuts includes forming at least one through cut having, on said opposite exposed main surfaces of said multilayer substrate, at least two branches of equal length.

14. The method as claimed claim 12, wherein forming said plurality of through cuts includes forming at least one through cut having, on said opposite exposed main surfaces of said multilayer substrate, at least two branches of equal width.

15. The method as claimed in claim 12, wherein said multilayer substrate extends along a length direction (X) and a width direction (Y) substantially perpendicular to said length direction (X), and wherein forming said plurality of through cuts includes forming, on said opposite exposed main surfaces of said multilayer substrate, for at least two of said through cuts, two respective branches extending along a direction which is parallel to one of said directions (X) or (Y).

16. The method as claimed in claim 12, wherein forming the plurality of through cuts includes forming, on said opposite exposed main surfaces of said multilayer substrate, N through cuts/cm$^2$, with N ranging from 2 to 100,000,000.

17. The method as claimed in claim 12, wherein the thickness of said bottom layer is comprised between 1 nm and 500 µm.

18. The method as claimed in claim 12, wherein said top layer is formed of a conductive metal oxide.

19. The method as claimed in claim 12, wherein the thickness of said top layer is comprised between 1 nm and 500 µm.

20. The method as claimed in claim 12, wherein the multilayer substrate forms a stretchable electrode.

* * * * *